(12) United States Patent
Tsukamoto et al.

(10) Patent No.: US 9,017,614 B2
(45) Date of Patent: Apr. 28, 2015

(54) EXHAUST PURIFICATION SYSTEM OF INTERNAL COMBUSTION ENGINE

(75) Inventors: Yoshihisa Tsukamoto, Susono (JP); Hiromasa Nishioka, Susono (JP); Kohei Yoshida, Gotenba (JP); Yuki Bisaiji, Mishima (JP); Junichi Matsuo, Susono (JP); Takamitsu Asanuma, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/259,574

(22) PCT Filed: Dec. 6, 2010

(86) PCT No.: PCT/JP2010/072299
§ 371 (c)(1),
(2), (4) Date: Sep. 23, 2011

(87) PCT Pub. No.: WO2012/077240
PCT Pub. Date: Jun. 14, 2012

(65) Prior Publication Data
US 2013/0243658 A1     Sep. 19, 2013

(51) Int. Cl.
*B01D 53/00*      (2006.01)
*B01D 53/56*      (2006.01)
(Continued)

(52) U.S. Cl.
CPC ............ *B01D 53/9431* (2013.01); *F01N 3/021* (2013.01); *F01N 3/0814* (2013.01);
(Continued)

(58) Field of Classification Search
None
See application file for complete search history.

(56) References Cited

U.S. PATENT DOCUMENTS

| 5,052,178 A | 10/1991 | Clerc et al. |
| 5,057,483 A | 10/1991 | Wan |

(Continued)

FOREIGN PATENT DOCUMENTS

| CN | 101454081 A | 6/2009 |
| CN | 101600860 A | 12/2009 |

(Continued)

OTHER PUBLICATIONS

Mar. 22, 2011 International Search Report issued in International Patent Application No. PCT/JP2010/07229.

(Continued)

*Primary Examiner* — Walter D Griffin
*Assistant Examiner* — Jelitza Perez
(74) *Attorney, Agent, or Firm* — Oliff PLC

(57) ABSTRACT

In an internal combustion engine, inside of an engine exhaust passage, an $NO_x$ adsorption part and an $NO_x$ purification part are arranged. The $NO_x$ purification part has the property of reducing $NO_x$ which is contained in exhaust gas if the concentration of hydrocarbons is made to vibrate by within a predetermined range of amplitude and within a predetermined range of period. When $NO_x$ is to be desorbed from the $NO_x$ adsorption part, the current $NO_x$ which is contained in the exhaust gas and the $NO_x$ which is desorbed from the $NO_x$ adsorption part are reduced by making the concentration of hydrocarbons of the $NO_x$ purification part vibrate by the amplitude and period which are set for the current engine operating state, at least of which ($\Delta T \cdot k$) has been corrected so that the amount of hydrocarbons becomes greater.

8 Claims, 12 Drawing Sheets

(51) Int. Cl.
*F01N 3/00* (2006.01)
*B01D 53/94* (2006.01)
*F01N 3/021* (2006.01)
*F01N 3/08* (2006.01)
*F01N 9/00* (2006.01)
*F01N 13/00* (2010.01)

(52) U.S. Cl.
CPC ............ F01N3/0842 (2013.01); F01N 3/0871 (2013.01); F01N 9/00 (2013.01); F01N 2240/30 (2013.01); F01N 2510/0684 (2013.01); F01N 2610/03 (2013.01); F01N 2900/0601 (2013.01); F01N 2900/1602 (2013.01); F01N 2900/1626 (2013.01); Y02T 10/47 (2013.01); B01D 53/9418 (2013.01); B01D 53/9422 (2013.01); B01D 53/9495 (2013.01); B01D 2251/208 (2013.01); B01D 2255/1021 (2013.01); B01D 2255/1025 (2013.01); B01D 2255/9022 (2013.01); B01D 2255/91 (2013.01); B01D 2258/012 (2013.01); Y02T 10/24 (2013.01); F01N 13/009 (2013.01)

(56) References Cited

U.S. PATENT DOCUMENTS

| | | | |
|---|---|---|---|
| 5,075,274 A | 12/1991 | Kiyohide et al. | |
| 5,402,641 A | 4/1995 | Katoh et al. | |
| 5,882,607 A | 3/1999 | Miyadera et al. | |
| 6,109,024 A | 8/2000 | Kinugasa et al. | |
| 6,327,851 B1 | 12/2001 | Bouchez et al. | |
| 6,413,483 B1 | 7/2002 | Brisley et al. | |
| 6,477,834 B1 * | 11/2002 | Asanuma et al. | 60/295 |
| 6,667,018 B2 | 12/2003 | Noda et al. | |
| 6,813,882 B2 | 11/2004 | Hepburn et al. | |
| 6,854,264 B2 | 2/2005 | Elwart et al. | |
| 6,877,311 B2 | 4/2005 | Uchida | |
| 6,983,589 B2 | 1/2006 | Lewis, Jr. et al. | |
| 7,063,642 B1 | 6/2006 | Hu et al. | |
| 7,073,325 B2 | 7/2006 | Nakatani et al. | |
| 7,082,753 B2 | 8/2006 | Dalla Betta et al. | |
| 7,111,456 B2 | 9/2006 | Yoshida et al. | |
| 7,137,379 B2 | 11/2006 | Sasaki et al. | |
| 7,146,800 B2 | 12/2006 | Toshioka et al. | |
| 7,165,393 B2 | 1/2007 | Betta et al. | |
| 7,299,625 B2 | 11/2007 | Uchida et al. | |
| 7,332,135 B2 * | 2/2008 | Gandhi et al. | 422/177 |
| 7,412,823 B2 | 8/2008 | Reuter et al. | |
| 7,454,900 B2 | 11/2008 | Hayashi | |
| 7,484,504 B2 | 2/2009 | Kato et al. | |
| 7,506,502 B2 | 3/2009 | Nakano et al. | |
| 7,549,284 B2 | 6/2009 | Iihoshi et al. | |
| 7,703,275 B2 | 4/2010 | Asanuma et al. | |
| 7,707,821 B1 | 5/2010 | Legare | |
| 7,861,516 B2 | 1/2011 | Allansson et al. | |
| 8,099,950 B2 | 1/2012 | Kojima et al. | |
| 8,215,101 B2 | 7/2012 | Tsujimoto et al. | |
| 8,261,532 B2 | 9/2012 | Fukuda et al. | |
| 8,281,569 B2 | 10/2012 | Handa et al. | |
| 8,434,296 B2 | 5/2013 | Wada et al. | |
| 8,572,950 B2 | 11/2013 | Bisaiji et al. | |
| 8,656,706 B2 | 2/2014 | Umemoto et al. | |
| 8,671,667 B2 | 3/2014 | Bisaiji et al. | |
| 8,679,410 B2 | 3/2014 | Umemoto et al. | |
| 8,689,543 B2 | 4/2014 | Numata et al. | |
| 8,695,325 B2 | 4/2014 | Bisaiji et al. | |
| 2001/0052232 A1 | 12/2001 | Hoffmann et al. | |
| 2002/0029564 A1 | 3/2002 | Roth et al. | |
| 2003/0010020 A1 | 1/2003 | Taga et al. | |
| 2003/0040432 A1 * | 2/2003 | Beall et al. | 502/332 |
| 2003/0101713 A1 | 6/2003 | Dalla Betta et al. | |
| 2004/0045285 A1 | 3/2004 | Penetrante et al. | |
| 2004/0050037 A1 | 3/2004 | Betta et al. | |
| 2004/0055285 A1 | 3/2004 | Rohr et al. | |
| 2004/0154288 A1 | 8/2004 | Okada et al. | |
| 2004/0175305 A1 | 9/2004 | Nakanishi et al. | |
| 2004/0187477 A1 | 9/2004 | Okugawa et al. | |
| 2005/0135977 A1 | 6/2005 | Park et al. | |
| 2005/0147541 A1 | 7/2005 | Ajisaka et al. | |
| 2006/0053778 A1 | 3/2006 | Asanuma et al. | |
| 2006/0107657 A1 | 5/2006 | Bernler et al. | |
| 2006/0153761 A1 | 7/2006 | Bandl-Konrad et al. | |
| 2006/0286012 A1 | 12/2006 | Socha et al. | |
| 2007/0016357 A1 | 1/2007 | Nakagawa et al. | |
| 2007/0028601 A1 | 2/2007 | Duvinage et al. | |
| 2007/0059223 A1 | 3/2007 | Golunski et al. | |
| 2007/0089403 A1 | 4/2007 | Pfeifer et al. | |
| 2007/0125073 A1 | 6/2007 | Reuter | |
| 2007/0151232 A1 | 7/2007 | Dalla Betta et al. | |
| 2008/0022662 A1 | 1/2008 | Yan | |
| 2008/0053073 A1 | 3/2008 | Kalyanaraman et al. | |
| 2008/0102010 A1 | 5/2008 | Bruck et al. | |
| 2008/0120963 A1 | 5/2008 | Morita et al. | |
| 2008/0148711 A1 | 6/2008 | Takubo | |
| 2008/0154476 A1 | 6/2008 | Takubo | |
| 2008/0196398 A1 | 8/2008 | Yan | |
| 2008/0223020 A1 | 9/2008 | Yoshida et al. | |
| 2008/0276602 A1 | 11/2008 | McCabe et al. | |
| 2009/0000277 A1 | 1/2009 | Yoshida et al. | |
| 2009/0049824 A1 | 2/2009 | Kojima et al. | |
| 2009/0049825 A1 | 2/2009 | Ohashi | |
| 2009/0049826 A1 | 2/2009 | Toshioka et al. | |
| 2009/0077948 A1 | 3/2009 | Mondori et al. | |
| 2009/0084091 A1 | 4/2009 | Tsujimoto et al. | |
| 2009/0118121 A1 | 5/2009 | Sarai | |
| 2009/0120072 A1 | 5/2009 | Dalla Betta et al. | |
| 2009/0151332 A1 | 6/2009 | Toshioka et al. | |
| 2009/0191108 A1 | 7/2009 | Blanchard et al. | |
| 2009/0196811 A1 | 8/2009 | Yamashita et al. | |
| 2009/0229251 A1 | 9/2009 | Kadowaki | |
| 2009/0249768 A1 | 10/2009 | Asanuma et al. | |
| 2009/0266057 A1 | 10/2009 | Tsujimoto et al. | |
| 2009/0282809 A1 | 11/2009 | Toshioka | |
| 2009/0288393 A1 | 11/2009 | Matsuno et al. | |
| 2009/0313970 A1 | 12/2009 | Iida | |
| 2010/0005873 A1 | 1/2010 | Katoh et al. | |
| 2010/0055012 A1 | 3/2010 | Grisstede et al. | |
| 2010/0107613 A1 | 5/2010 | Masuda et al. | |
| 2010/0115923 A1 | 5/2010 | Tsujimoto et al. | |
| 2010/0126148 A1 | 5/2010 | Morishima et al. | |
| 2010/0132356 A1 | 6/2010 | Lee | |
| 2010/0154387 A1 | 6/2010 | Shibata et al. | |
| 2010/0233051 A1 | 9/2010 | Grisstede et al. | |
| 2010/0236224 A1 | 9/2010 | Kumar et al. | |
| 2010/0242459 A1 | 9/2010 | Tsujimoto et al. | |
| 2011/0041486 A1 | 2/2011 | Kato et al. | |
| 2011/0047984 A1 | 3/2011 | Lee et al. | |
| 2011/0047988 A1 | 3/2011 | Lewis et al. | |
| 2011/0113754 A1 | 5/2011 | Kohara et al. | |
| 2011/0120100 A1 | 5/2011 | Yin et al. | |
| 2011/0131952 A1 | 6/2011 | Onodera et al. | |
| 2011/0173950 A1 | 7/2011 | Wan et al. | |
| 2011/0209459 A1 | 9/2011 | Hancu et al. | |
| 2012/0122660 A1 | 5/2012 | Anderson et al. | |
| 2012/0124967 A1 | 5/2012 | Yang et al. | |
| 2012/0124971 A1 | 5/2012 | Bisaiji et al. | |
| 2012/0131908 A1 | 5/2012 | Bisaiji et al. | |
| 2013/0000284 A1 | 1/2013 | Bisaiji et al. | |
| 2013/0011302 A1 | 1/2013 | Bisaiji et al. | |
| 2013/0022512 A1 | 1/2013 | Bisaiji et al. | |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1 710 407 A1 | 10/2006 |
| EP | 1 793 099 A1 | 6/2007 |
| EP | 1 911 506 | 4/2008 |
| EP | 1 936 164 A1 | 6/2008 |
| EP | 1 965 048 A1 | 9/2008 |
| EP | 2 063 078 A1 | 5/2009 |

(56) References Cited

FOREIGN PATENT DOCUMENTS

| | | |
|---|---|---|
| EP | 2 149 684 A1 | 2/2010 |
| EP | 2 239 432 | 10/2010 |
| EP | 2 460 989 A1 | 6/2012 |
| JP | A-04-200637 | 7/1992 |
| JP | A-H08-117601 | 5/1996 |
| JP | A-09-004437 | 1/1997 |
| JP | A-H09-220440 | 8/1997 |
| JP | A-11-30117 | 2/1999 |
| JP | A-11-62559 | 3/1999 |
| JP | A-11-081994 | 3/1999 |
| JP | A-2000-257419 | 9/2000 |
| JP | A-2002-188429 | 7/2002 |
| JP | A-2004-16850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-113801 | 4/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A 2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 A1 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 A2 | 1/2008 |
| WO | WO 2009/016822 | 2/2009 |
| WO | WO 2009/056958 | 5/2009 |
| WO | WO 2009/082035 A1 | 7/2009 |
| WO | WO 2011/114499 A1 | 9/2011 |
| WO | WO 2011/114501 A1 | 9/2011 |
| WO | WO 2011/118044 A1 | 9/2011 |

OTHER PUBLICATIONS

Corrected Notice of Allowability dated Feb. 6, 2014 issued in U.S. Appl. No. 13/202,694.
Written Opinion for PCT Application No. PCT/JP2010/065186 mailed Nov. 22, 2010.
International Search Report for PCT Application No. PCT/JP2010/065186 mailed Nov. 22, 2010 (with translation).
International Search Report dated Jun. 15, 2010 issued in PCT/JP2010/054730 (with translation).
Mar. 15, 2011 International Search Report issued in International Application No. PCT/JP2011/053429.
Nov. 22, 2010 International Search Report issued in International Patent Application No. PCT/JP2010/065187.
Nov. 26, 2012 Office Action issued in U.S. Appl. No. 13/202,694.
U.S. Appl. No. 13/264,230 in the name of Bisaiji et al. filed Oct. 13, 2011.
U.S. Appl. No. 13/262,858 in the name of Bisaiji et al. filed Oct. 4, 2011.
May 15, 2013 Office Action in U.S. Appl. No. 13/202,694.
U.S. Appl. No. 13/202,733 in the name of Bisaiji et al. filed Sep. 30, 2011.
Notice of Allowance dated Oct. 17, 2013 issued in U.S. Appl. No. 13/202,694.
Office Action dated Dec. 20, 2013 issued in U.S. Appl. No. 13/264,230.
Oct. 26, 2012 Office Action issued in U.S. Appl. No. 13/202,692.
U.S. Appl. No. 13/202,692 in the name of Umemoto et al. filed Sep. 20, 2011.
Notice of Allowance dated Nov. 13, 2013 issued in U.S. Appl. No. 13/202,692.
Office Action dated Oct. 23, 2013 issued in U.S. Appl. No. 13/263,272.
Office Action dated Jul. 24, 2013 issued in U.S. Appl. No. 13/202,692.
Office Action dated Apr. 23, 2014 issued in U.S. Appl. No. 13/260,986.
Notice of Allowance dated Mar. 4, 2014 issued in U.S. Appl. No. 13/255,786.
Office Action dated Jun. 23, 2014 issued in U.S. Appl. No. 13/262,858.
Office Action dated May 8, 2014 issued in U.S. Appl. No. 13/375,674.
Office Action dated May 2, 2014 issued in U.S. Appl. No. 13/263,660.
Jun. 19, 2014 Office Action issued in U.S. Appl. No. 13/264,594.
U.S. Appl. No. 13/264,594 filed Oct. 14, 2011 in the name of Inoue et al.
U.S. Appl. No. 13/375,674 filed Dec. 1, 2011 in the name of Inoue et al.
Notice of Allowance dated Mar. 28, 2014 issued in U.S. Appl. No. 13/582,862.
Jan. 18, 2011 International Search Report issued in International Patent Application No. PCT/JP2010/068785.
Jan. 18, 2011 International Search Report issued in International Patent Application No. PCT/JP2010/067707.
Dec. 21, 2010 Search Report issued in International Patent Application No. PCT/JP2010/065449 (with translation).
Jan. 18, 2011 International Search Report issued in International Patent Application No. PCT/JP2010/067705.
U.S. Appl. No. 13/263,272 in the name of Bisaiji et al. filed on Oct. 6, 2011.
U.S. Appl. No. 13/264,062 in the name of Watanabe et al. filed on Oct. 12, 2011.
U.S. Appl. No. 13/264,884 in the name of Bisaiji et al. filed Oct. 17, 2011.
Oct. 26, 2010 International Search Report issued in International Patent Application No. PCT/JP2010/063135.
U.S. Appl. No. 13/257,789 in the name of Nishioka et al. filed on Oct. 14, 2011.
Mar. 8, 2011 International Search Report issued in International Application No. PCT/JP2011/052969 (with translation).
U.S. Appl. No. 13/263,660 in the name of Umemoto et al filed on Oct. 7, 2011.
International Search Report issued in International Patent Application No. PCT/JP2011/075618 dated Dec. 27, 2011.
Written Opinion issued in International Patent Application No. PCT/JP2011/075618 dated Dec. 27, 2011.

(56) References Cited

OTHER PUBLICATIONS

U.S. Appl. No. 13/580,000 in the name of Bisaiji et al. filed on Aug. 20, 2012.
International Search Report dated Jun. 29, 2010 in International Application No. PCT/JP2010/055303.
U.S. Appl. No. 13/258,483 in the name of Numata et al. filed Sep. 22, 2011.
U.S. Appl. No. 13/202,694 in the name of Bisaiji et al. filed Aug. 22, 2011.
U.S. Appl. No. 13/582,862 filed Sep. 5, 2012 in the name of Uenishi et al.
Office Action dated Jul. 1, 2014 issued in U.S. Appl. No. 13/257,789.
Office Action dated Jun. 26, 2014 issued in U.S. Appl. No. 13/580,000.
U.S. Appl. No. 13/582,909 in the name of Umemoto et al. filed Sep. 5, 2012.
U.S. Appl. No. 13/578,148 in the name of Umemoto et al. filed Aug. 9, 2012.
Jun. 18, 2014 Office Action issued in U.S. Appl. No. 13/582,909.
U.S. Appl. No. 13/581,186 in the name of Umemoto et al. filed Aug. 24, 2012.
Jun. 16, 2014 Office Action issued in U.S. Appl. No. 13/581,186.
Office Action dated Aug. 8, 2013 issued in U.S. Appl. No. 13/258,483.
Office Action dated Jul. 14, 2014 issued in U.S. Appl. No. 13/262,001.
U.S. Appl. No. 13/262,001 in the name of Inoue et al., filed Oct. 19, 2011.
Office Action dated Jul. 14, 2014 issued in U.S. Appl. No. 13/264,884.
U.S. Appl. No. 14/152,629 in the name of Umemoto et al., filed Jan. 10, 2014.
Notice of Allowance dated Oct. 4, 2013 issued in U.S. Appl. No. 13/259,885.
U.S. Appl. No. 14/108,113 in the name of Bisaiji et al., filed Dec. 16, 2013.
U.S. Appl. No. 13/260,986 in the name of Watanabe et al., filed on Sep. 29, 2011.
U.S. Appl. No. 13/259,885 in the name of Umemoto et al., filed Sep. 23, 2011.
Nov. 27, 2013 Notice of Allowance issued in U.S. Appl. No. 13/258,483.
May 7, 2014 Office Action issued in U.S. Appl. No. 13/264,062.
Mar. 15, 2011 International Preliminary Report on Patentability issued in International Application No. PCT/JP2011/053429 (with translation).
Jun. 15, 2010 International Search Report issued in International Patent Application No. PCT/JP2010/054740 (with translation).
Jun. 15, 2010 Written Opinion issued in PCT/JP2010/054740 (with translation).
Jun. 20, 2012 Search Report issued in European Patent Application No. 10845966.0.
Jun. 15, 2010 international Search Report issued in International Application No. PCT/JP2010/054731 (with translation).
Jun. 29, 2010 International Search Report issued in International Patent Application No. PCT/JP2010/056345.
Apr. 4, 2013 Office Action issued in Application No. 13/255,710.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
U.S. Appl. No. 13/934,080 in the name of Bisaiji et al., filed Jul. 2, 2013.
U.S. Appl. No. 13/499,211 in the name of Bisaiji et al, filed Mar. 29, 2012.
U.S. Appl. No. 13/502,210 in the name of Bisaiji et al., filed on Apr. 16, 2012.
Oct. 24, 2013 Office Action issued in U.S. Appl. No. 13/255,710.
Jan. 17, 2013 Office Action issued in U.S. Appl. No. 13/202,733.
Jun. 15, 2010 International Search Report issued in International Patent Application No. PCT/JP2010/051729.
Sep. 13, 2011 International Search Report issued in International Patent Application No. PCT/JP2011/066628 (with Translation).
Jan. 22, 2014 Office Action issued in U.S. Appl. No. 13/499,211.
May 27, 2014 Office Action issued in U.S. Appl. No. 13/255,710.
Sep. 18, 2014 Notice of Allowance issued in U.S. Appl. No. 13/255,710.
Oct. 2, 2014 Office Action issued in U.S. Appl. No. 13/582,862.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/262,506 in the name of Bisaiji et al, filed Sep. 30, 2011.
Dec. 22, 2014 Office Action issued in U.S. Appl. No. 13/264,230.

\* cited by examiner

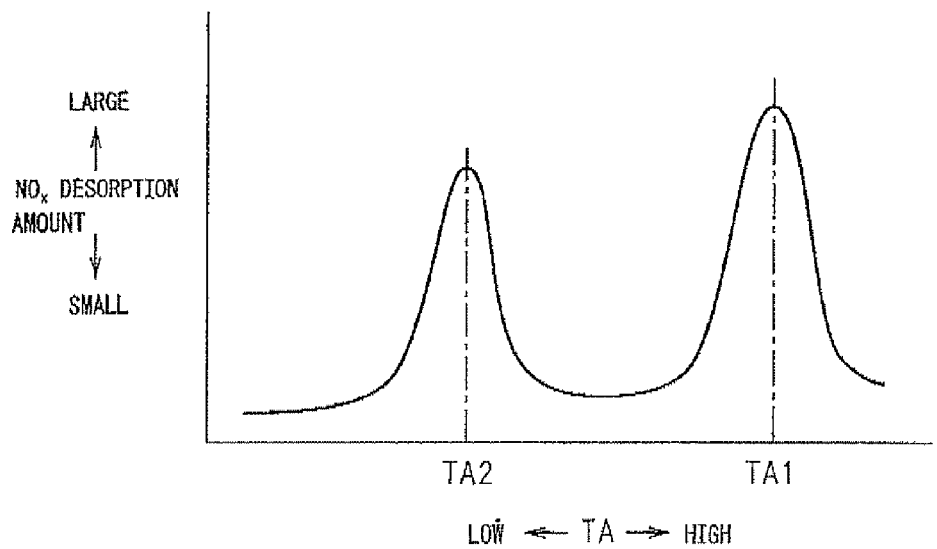

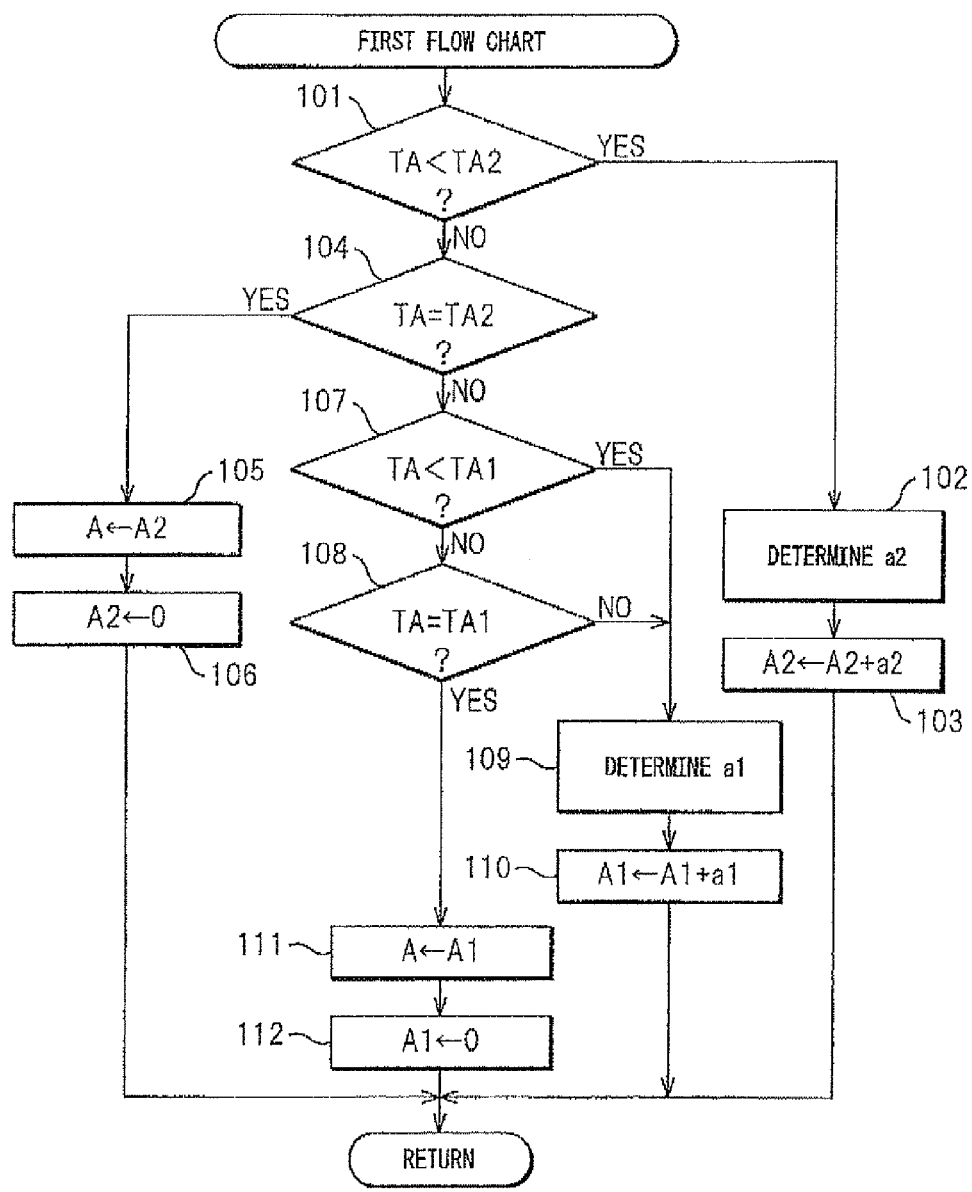

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, refer to Japanese Patent No. 3969450).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

Further, it has been proposed to estimate the $NO_x$ storage amount of the $NO_x$ storage catalyst and, when the estimated $NO_x$ storage amount has become a set amount and if the temperature of the $NO_x$ storage catalyst is a set temperature more, judge that the $NO_x$ should be released and make the air-fuel ratio of the exhaust gas flowing into the $NO_x$ storage catalyst rich. (for example, refer to Japanese Unexamined Patent Publication No. 2009-275631).

DISCLOSURE OF THE INVENTION

The above-mentioned $NO_x$ storage catalyst can give an excellent $NO_x$ purification rate if the catalyst is activated. However, the $NO_x$ storage catalyst falls in $NO_x$ purification rate if becoming a high temperature and, further, cannot store $NO_x$ before the catalyst becomes activated. There is room for further reduction of the amount of $NO_x$ which is released into the atmosphere.

An object of the present invention is to provide an exhaust purification system of an internal combustion engine which considers the treatment of $NO_x$ before activation of the catalyst while able to give a high $NO_x$ purification rate even if the temperature of the catalyst becomes a high temperature.

An exhaust purification system of an internal combustion engine according to the present invention described in claim 1 is characterized in that an $NO_x$ adsorption part and an $NO_x$ purification part are arranged inside of an engine exhaust passage, the $NO_x$ purification part causes $NO_x$ which is contained in exhaust gas and modified hydrocarbons to react, precious metal catalysts are carried on an exhaust gas flow surface of the $NO_x$ purification part, a basic exhaust gas flow surface part is formed around the precious metal catalysts, the $NO_x$ purification part has the property of reducing the $NO_x$ which is contained in the exhaust gas if a concentration of hydrocarbons which pass over the exhaust gas flow surface of the $NO_x$ purification part is made to vibrate by within a predetermined range of amplitude and within a predetermined range of period and has the property that a storage amount of $NO_x$ which is contained in the exhaust gas increases if the vibration period of the hydrocarbon concentration is made longer than the predetermined range, the $NO_x$ adsorption part has the property of adsorbing the $NO_x$ which is contained in the exhaust gas and causing the adsorbed $NO_x$ to desorb when the temperature rises, to reduce the current $NO_x$ which is contained in the exhaust gas, the amplitude and period for causing vibration of the concentration of hydrocarbons which pass over the exhaust gas flow surface of the $NO_x$ purification part are set for the current engine operating state, and, when $NO_x$ is desorbed from the $NO_x$ adsorption part, to reduce the $NO_x$ which is contained in the current exhaust gas and the $NO_x$ which is desorbed from the $NO_x$ adsorption part, the concentration of hydrocarbons which pass over the exhaust gas flow surface of the $NO_x$ purification part is made to vibrate by the amplitude and the period which are set for the current engine operating state, at least of which has been corrected within the predetermined ranges so that the amount of hydrocarbons which pass over the exhaust gas flow surface of the $NO_x$ purification part becomes greater.

An exhaust purification system of an internal combustion engine according to the present invention described in claim 2 comprises an exhaust purification system of an internal combustion engine as set forth in claim 1 characterized in that the $NO_x$ adsorption part makes $NO_x$ be desorbed from it at a low temperature side desorption temperature lower than the activation temperature of the precious metal catalysts of the $NO_x$ purification part and in that before the $NO_x$ adsorption part becomes the low temperature side desorption temperature, the $NO_x$ purification part is fed with hydrocarbons to make the precious metal catalysts rise to the activation temperature.

An exhaust purification system of an internal combustion engine according to the present invention described in claim 3 comprises an exhaust purification system of an internal combustion engine as set forth in claim 1 or 2 characterized in that the $NO_x$ purification part is formed as a top coat layer on a substrate and in that the $NO_x$ adsorption part is formed as a bottom coat layer on the substrate.

According to the exhaust purification system of an internal combustion engine according to the present invention described in claim 1, at the time of a low temperature where the $NO_x$ purification part cannot reduce the $NO_x$ in the exhaust gas, the $NO_x$ adsorption part can adsorb the $NO_x$ in the exhaust gas so as to decrease the amount of $NO_x$ which is released into the atmosphere. When the $NO_x$ adsorption part desorbs the adsorbed $NO_x$, it has to decrease the amount of $NO_x$ which is released into the atmosphere by reducing not only the current $NO_x$ which is contained the exhaust gas, but also the $NO_x$ which is desorbed from the $NO_x$ adsorption part. Even if making the concentration of hydrocarbons which pass over the exhaust gas flow surface of the $NO_x$ purification part vibrate by the amplitude and period preset for reducing the $NO_x$ contained in the exhaust for the current engine operating state, the $NO_x$ which is desorbed from the $NO_x$ adsorption part cannot be sufficiently reduced, so the concentration of hydrocarbons which pass over the exhaust gas flow surface of the $NO_x$ purification part is made to vibrate by the amplitude and period preset for the current engine operating state, at least of which has been corrected within the respective predetermined ranges so that the amount of hydrocarbons which pass over the exhaust gas flow surface of the $NO_x$ purification part becomes greater. By increasing the feed amount of the hydrocarbons, it is possible to sufficiently reduce even the $NO_x$ which is desorbed from the $NO_x$ adsorption part. Due to this, an overall high $NO_x$ purification rate can be obtained.

According to the exhaust purification system of an internal combustion engine according to the present invention described in claim 2, there is provided the exhaust purification system of an internal combustion engine as set forth in claim 1 wherein the $NO_x$ adsorption part causes the $NO_x$ to be desorbed even at a low temperature side desorption temperature lower than the activation temperature of the precious metal catalyst of the $NO_x$ purification part. By feeding hydrocarbons to the $NO_x$ purification part to make the precious metal catalyst rise to the activation temperature before the $NO_x$ adsorption part becomes the low temperature side desorption temperature, it is possible to make the concentration of hydrocarbons which pass over the exhaust gas flow surface of the $NO_x$ purification part vibrate to enable good reduction of not only the $NO_x$ which is contained in the exhaust gas but also the $NO_x$ which is desorbed from the $NO_x$ adsorption part at the low temperature side desorption temperature.

According to the exhaust purification system of an internal combustion engine according to the present invention described in claim 3, there is provided the exhaust purification system of an internal combustion engine as set forth in claim 1 or 2 wherein the $NO_x$ purification part is formed as a top coat layer on a substrate and the $NO_x$ adsorption part is formed as a bottom coat layer on the substrate, so the $NO_x$ purification part and $NO_x$ adsorption part can be integrally formed.

BRIEF DESCRIPTION OF DRAWINGS

FIG. 16 is a view showing a map of an amplitude ΔH and period ΔT of change of the air-fuel ratio set for each engine operating state.

FIG. 17 is a view showing a relationship between a temperature and an $NO_x$ desorption amount of an $NO_x$ adsorption part.

FIG. 18 is a first flow chart for estimating an $NO_x$ desorption amount from an $NO_x$ adsorption part.

BEST MODE FOR CARRYING OUT THE INVENTION

Figure 1:
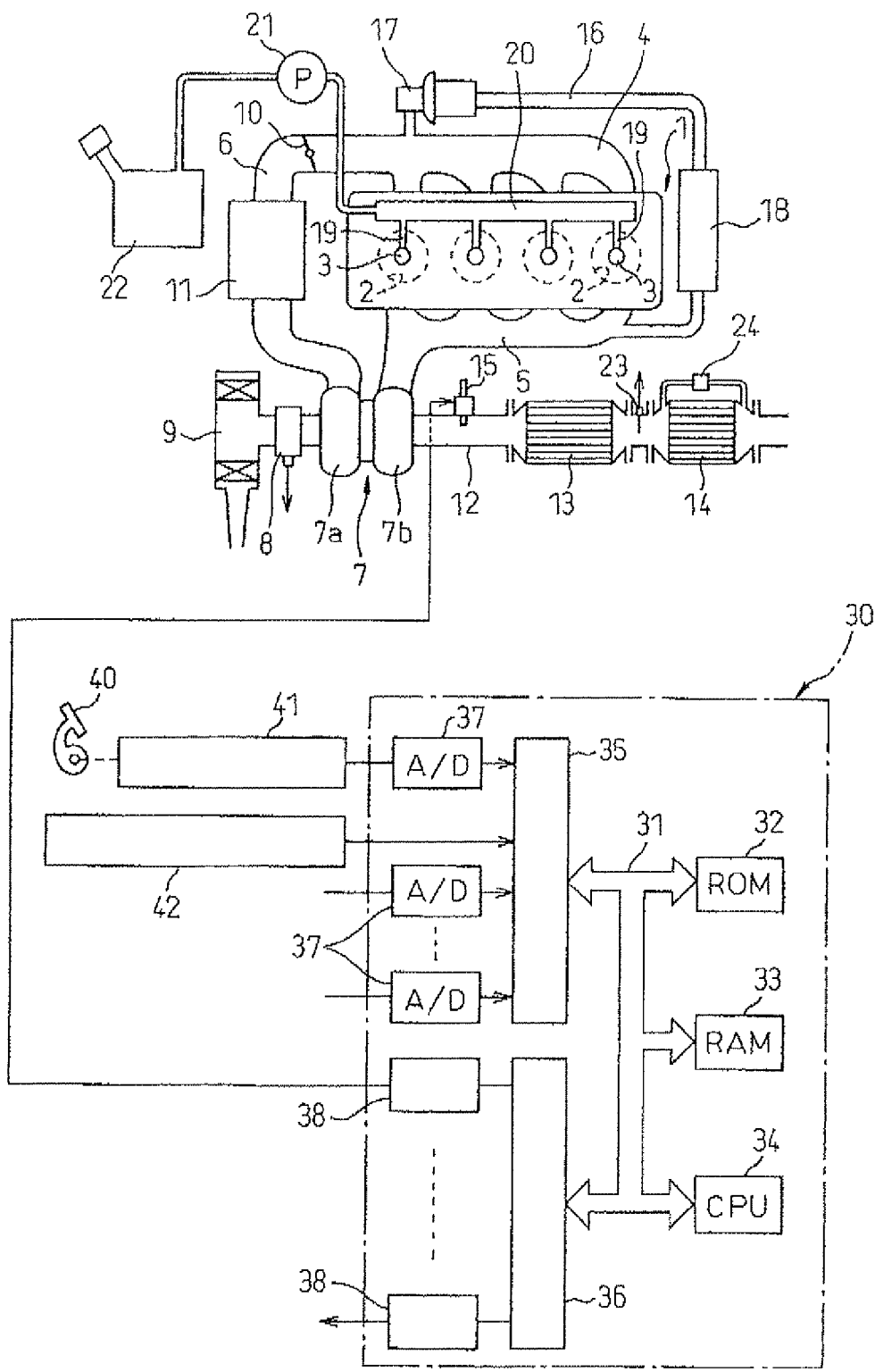
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12 to an inlet of the catalyst device 13, while an outlet of the catalyst device 13 is connected to a particulate filter 14 for trapping particulate which is contained in the exhaust gas. Inside the exhaust pipe 12 upstream of the catalyst device 13, a hydrocarbon feed valve 15 is arranged for feeding hydrocarbons comprised of diesel oil (gas oil) or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by a fuel pump 21 to the inside of the common rail 20. The fuel which is fed to the inside of the common rail 20 is fed through each fuel feed tube 19 to a fuel injector 3.

An electronic control unit 30 is comprised of a digital computer provided with components connected with each other by a bidirectional bus 31 such as a ROM (read only memory) 32, a RAM (random access memory) 33, a CPU (microprocessor) 34, an input port 35, and an output port 36. Downstream of the catalyst device 13, a temperature sensor 23 is attached for detecting the exhaust gas temperature. At the particulate filter 14, a differential pressure sensor 24 for detecting a differential pressure before and after the particulate filter 14 is attached. Further, at a header of an exhaust manifold 5, an air-fuel ratio sensor (not shown) is arranged. The output signals of these air-fuel ratio sensor, temperature sensor 23, differential pressure sensor 24, and intake air detector 8 are input through respectively corresponding AD converters 37 to the input port 35. Further, the accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 15, EGR control valve 17, and fuel pump 21.

Figure 2A:
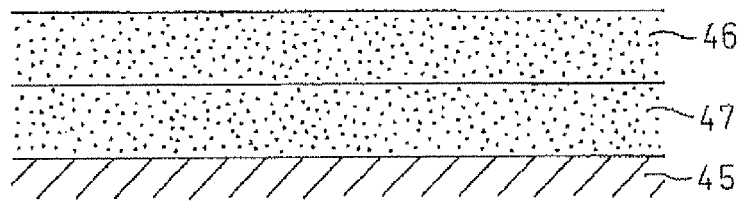
FIGS. 2A and 2B are views schematically showing a surface part of a catalyst device.

FIG. 2A schematically shows a surface part of a substrate of the catalyst device 13. This substrate 45 is for example comprised of cordierite. On this substrate 45, a coat layer comprised of a least two layers of a top coat layer 46 and a bottom coat layer 47 is formed. In the embodiment shown in FIG. 2A, the top coat layer 46 is comprised of a powder aggregate. This top coat layer 46 forms an $NO_x$ purification part for purifying $NO_x$. Therefore, first, this $NO_x$ purification part 46 and a new $NO_x$ purification method using this $NO_x$ purification part 46 will be explained.

Figure 2B:
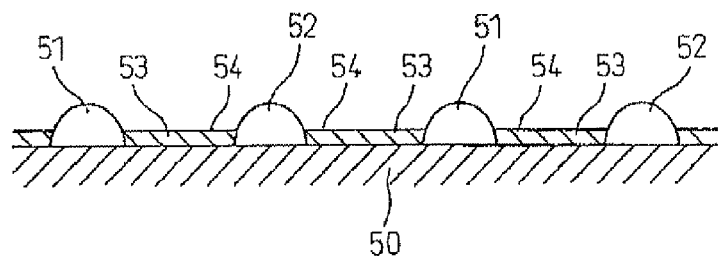

FIG. 2B schematically shows a surface part of a powder-shaped catalyst carrier which forms the $NO_x$ purification part 46. At this $NO_x$ purification part, as shown in FIG. 2B, for example, precious metal catalysts 51 and 52 are carried on a catalyst carrier 50 comprised of alumina. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the $NO_x$ purification part 46. Further, the surface of the basic layer 53 exhibits basicity, so the surface of the basic layer 53 is called the "basic exhaust gas flow surface part 54".

On the other hand, in FIG. 2B, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium. Rh. Note that, on the catalyst carrier 50 of the $NO_x$ purification part 46, in addition to platinum Pt and rhodium Rh, palladium Pd may be further carried or, instead of rhodium Rh, palladium. Pd may be carried. That is, the precious metal catalysts 51 and 52 which are carried on the catalyst carrier 50 are comprised of platinum Pt and at least one of rhodium Rh and palladium Pd.

Figure 3:
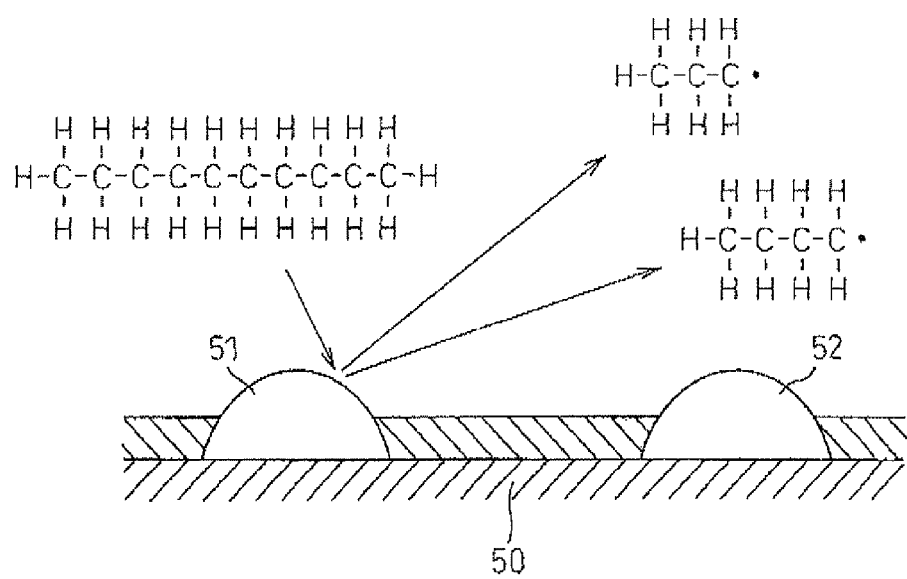
FIG. 3 is a view for explaining an oxidation reaction in an $NO_x$ purification part.

If hydrocarbons are injected from the hydrocarbon feed valve 15 into the exhaust gas, the hydrocarbons are modified in the $NO_x$ purification part 46. In the present invention, at this time, the modified hydrocarbons are used to purify the $NO_x$ at the $NO_x$ purification part 46. FIG. 3 schematically shows the modification action performed at the $NO_x$ purification part 46 at this time. As shown in FIG. 3, the hydrocarbons HC which are injected from the hydrocarbon feed valve 15 become radical hydrocarbons HC with less carbon atoms by the catalyst 51.

Note that, even if injecting fuel, that is, hydrocarbons, from a fuel injector 3 into a combustion chamber 2 during the latter half of the expansion stroke or during the exhaust stroke, the hydrocarbons are modified inside of the combustion chamber 2 or at the $NO_x$ purification part 46, and the $NO_x$ which is contained in the exhaust gas is purified by the modified hydrocarbons at the $NO_x$ purification part 46. Therefore, in the present invention, instead of feeding hydrocarbons from the hydrocarbon feed valve 15 to the inside of an engine exhaust passage, it is also possible to feed hydrocarbons into the combustion chamber 2 in the latter half of the expansion stroke or exhaust stroke. In this way, in the present invention, it is possible to feed hydrocarbons into a combustion chamber 2, but below, the present invention will be explained with reference to the case of trying to inject hydrocarbons from a hydrocarbon feed valve 15 to the inside of an engine exhaust passage.

Figure 4:
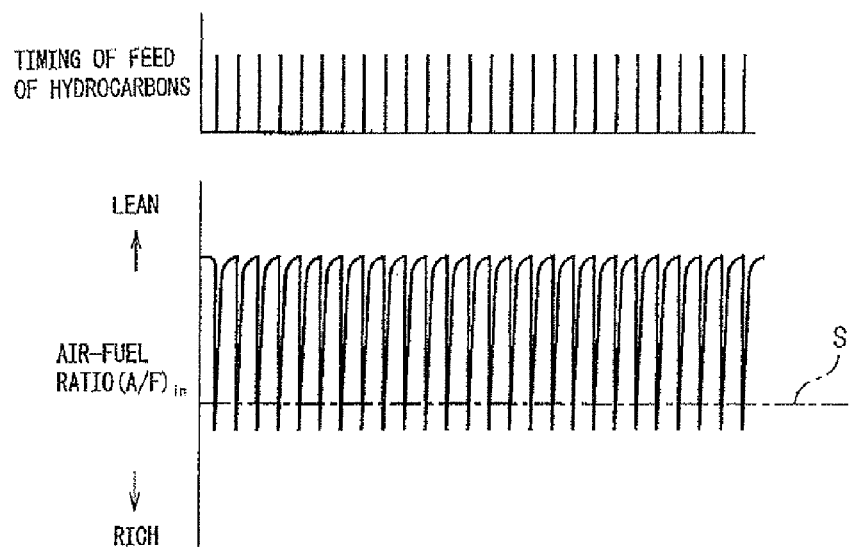
FIG. 4 is a view showing a change of an air-fuel ratio of exhaust gas flowing into a catalyst device.

FIG. 4 shows the timing of feeding hydrocarbons from the hydrocarbon feed valve 15 and the changes in the air-fuel ratio (A/F) in of the exhaust gas flowing into the catalyst device 13. Note that, the changes in the air-fuel ratio (A/F) in depend on the change in concentration of the hydrocarbons in the exhaust gas which flows into the catalyst device 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration becomes. Including FIG. 4, in the following explained FIG. 8 and FIG. 10 to FIG. 12, "S" indicates the stoichiometric air-fuel ratio.

Figure 5:
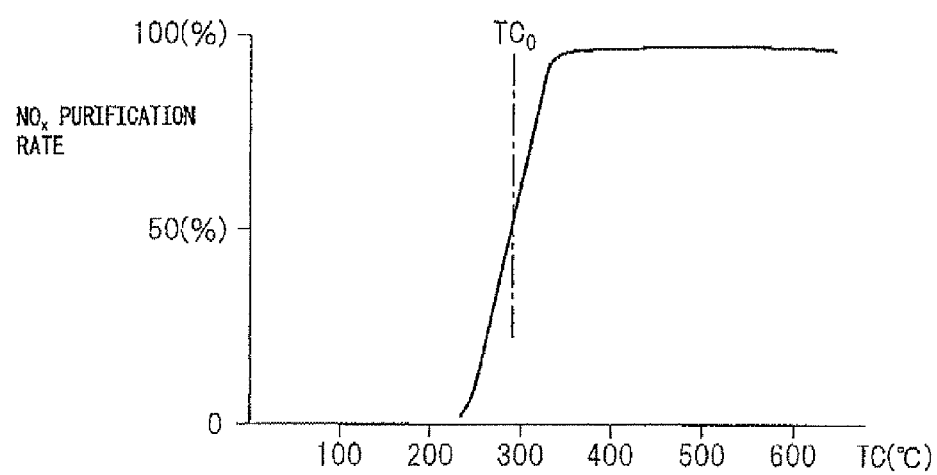
FIG. 5 is a view showing an $NO_x$ purification rate.

FIG. 5 shows the $NO_x$ purification rate by the $NO_x$ purification part 46 with respect to the catalyst temperatures TC of the $NO_x$ purification part 46 when periodically making the concentration of hydrocarbons flowing into the catalyst device 13 change so as to, as shown in FIG. 4, make the air-fuel ratio (A/F) in of the exhaust gas flowing to the catalyst device 13 change. The inventors learned that if making the concentration of hydrocarbons flowing into the $NO_x$ purification part 46 vibrate by within a predetermined range of amplitude and within a predetermined range of period, as shown in FIG. 5, an extremely high $NO_x$ purification rate is obtained even in a 400° C. or higher high temperature region.

Figure 6A:
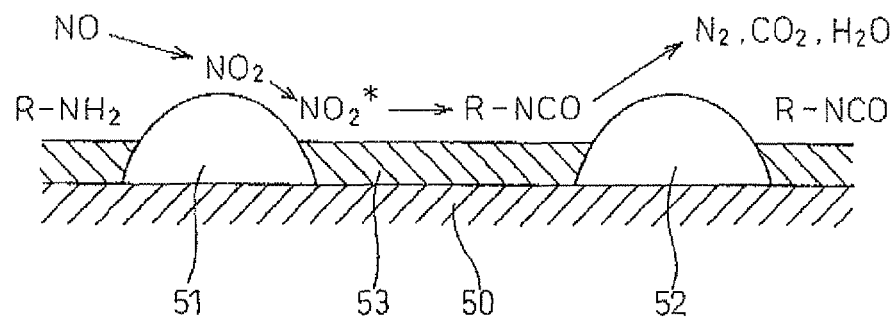
FIGS. 6A and 6B are views for explaining an oxidation reduction reaction in an $NO_x$ purification part.
Figure 6B:
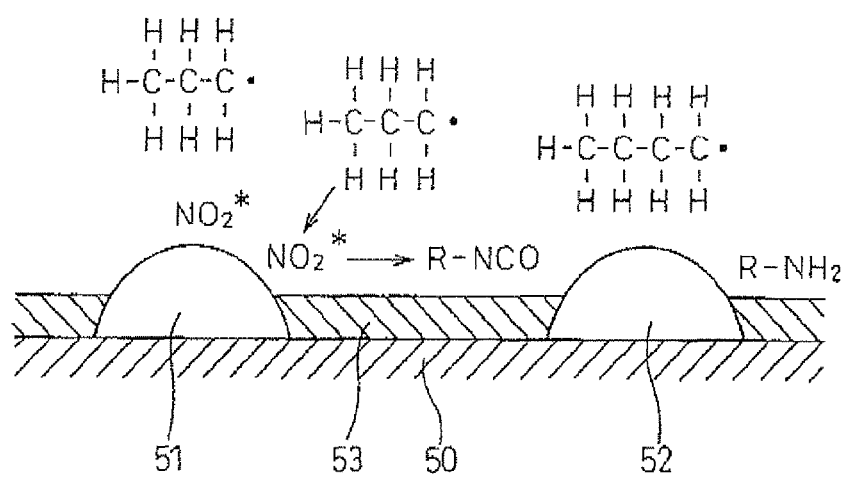

Furthermore, at this time, a large amount of reducing intermediate containing nitrogen and hydrocarbons continues to be held or adsorbed on the surface of the basic layer 53, that is, on the basic exhaust gas flow surface part 54 of the $NO_x$ purification part 46. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the $NO_x$ purification part 46. These FIGS. 6A and 6B show the reaction which is presumed to occur when the concentration of hydrocarbons flowing into the catalyst device 13 is made to vibrate by within a predetermined range of amplitude and within a predetermined range of period.

FIG. 6A shows when the concentration of hydrocarbons flowing into the catalyst device 13 is low, while FIG. 6B shows when hydrocarbons are fed from the hydrocarbon feed valve 15 and the concentration of hydrocarbons flowing into the catalyst device 13 becomes high.

Now, as will be understood from FIG. 4, the air-fuel ratio of the exhaust gas which flows into the catalyst device 13 is maintained lean except for an instant, so the exhaust gas which flows into the catalyst device 13 normally becomes a state of oxygen excess. Therefore, the NO which is contained in the exhaust gas, as shown in FIG. 6A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. This $NO_2^-$ is called the "active $NO_2^*$".

On the other hand, if hydrocarbons are fed from the hydrocarbon feed valve 15, as shown in FIG. 3, the hydrocarbons are modified and become radicalized in the $NO_x$ purification part 46. As a result, as shown in FIG. 6B, the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3^-$. However, if the hydrocarbon concentration around the active $NO_2^*$ is made higher before this predetermined time passes, as shown in FIG. 6B, the active $NO_2^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_3$ is produced, the result becomes a nitrile compound R—CN, but this nitrile compound R—CN can only survive for an instant in this state, so immediately becomes an isocyanate compound R—NCO. This isocyanate compound R—NCO is hydrolyzed to become amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, the concentration of hydrocarbons flowing into the catalyst device 13 is lowered and thereby the oxygen concentration becomes higher. If this happens, the hydrocarbons around the reducing intermediate will be oxidized. As a result, as shown in FIG. 6A, the reducing intermediate and the active $NO_2^*$ will react. At this time, the active $NO_2^*$ reacts with the reducing intermediate R—NCO or R—$NH_2$ to form $N_2$, $CO_2$, and $H_2O$ and consequently the $NO_x$ is purified.

In this way, in the $NO_x$ purification part 46, by making the concentration of hydrocarbons flowing into the catalyst device 13 higher, the reducing intermediate is produced. By making the concentration of hydrocarbons flowing into the catalyst device 13 lower and raising the oxygen concentration, the active $NO_2^*$ reacts with the reducing intermediate and the $NO_x$ is purified. That is, in order for the $NO_x$ purification part 46 to purify the $NO_x$, the concentration of hydrocarbons flowing into the catalyst device 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2^*$. That is, it is necessary to make the concentration of hydrocarbons flowing into the catalyst device 13 vibrate by within a predetermined range of amplitude. Note that, in this case, it is necessary to hold a sufficient amount of reducing intermediate R—NCO or R—$NH_2$ on the basic layer 53, that is, the basic exhaust gas flow surface part 54, until the produced reducing intermediate reacts with the active $NO_2^*$. For this reason, the basic exhaust gas flow surface part 54 is provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_2^*$ is absorbed in the basic layer 53 in the form of nitrates without producing a reducing intermediate. To avoid this, it is necessary to make the concentration of hydrocarbons flowing into the catalyst device 13 vibrate by within a predetermined range of period.

Therefore, in an embodiment of the present invention, to make the $NO_x$ which is contained in the exhaust gas and the modified hydrocarbons react and produce the reducing intermediate R—NCO or R—$NH_2$ containing nitrogen and hydrocarbons, precious metal catalysts 51 and 52 are carried OD the exhaust gas flow surface of the $NO_x$ purification part 16. To hold the produced reducing intermediate R—NCO or R—$NH_2$ inside the catalyst device 13, a basic exhaust gas flow surface part 54 is formed around the precious metal catalysts 51 and 52. Due to the reducing action of the reducing intermediate R—NCO or R—$NH_2$ which is held on the basic exhaust gas flow surface part 54, the $NO_x$ is reduced. The vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
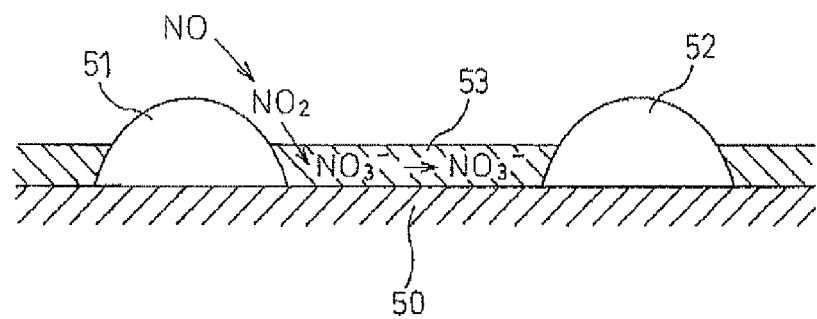
FIGS. 7A and 7B are views for explaining an oxidation reduction reaction in an $NO_x$ purification part.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_2^*$ which was produced on the platinum Pt 51, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
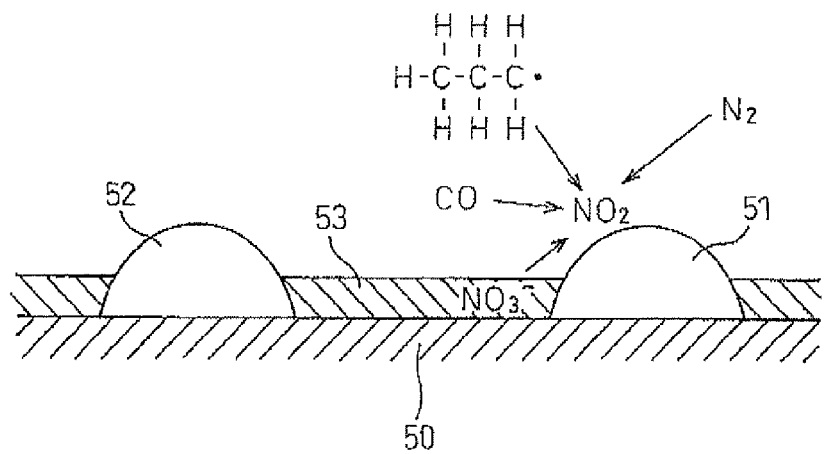

On the other hand, FIG. 7B shows the case where the air-fuel ratio of the exhaust gas which flows into the catalyst device 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$) and consequently the nitrates absorbed in the basic layer 53 gradually become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

Figure 8:
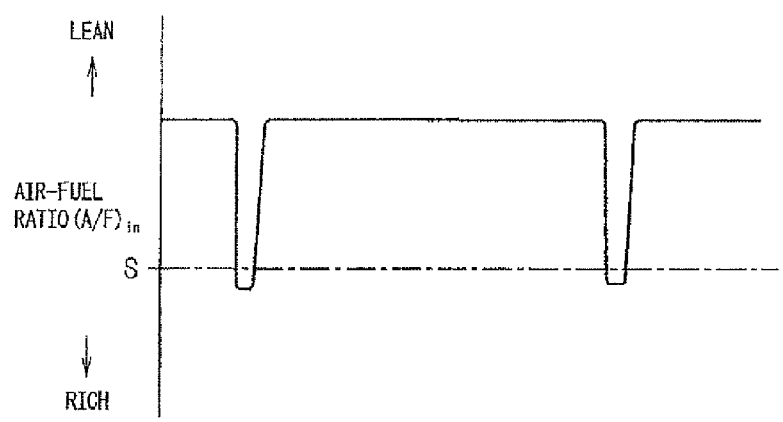
FIG. 8 is a view showing a change of an air-fuel ratio of exhaust gas flowing into a catalyst device.

FIG. 8 shows the case of making the air-fuel ratio (A/F) in of the exhaust gas which flows into the catalyst device 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of "storage" as a term including both "absorption" and "adsorption", at this time, the basic layer 53 performs the role of an $NO_x$ storage agent for temporarily storing the $NO_x$. That is, in this case, if the ratio of the air and fuel (hydrocarbons) which are fed into the engine intake passage, combustion chambers 2, and exhaust passage upstream of the catalyst device 13 is called the "air-fuel ratio of the exhaust gas", the exhaust purification part 46 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
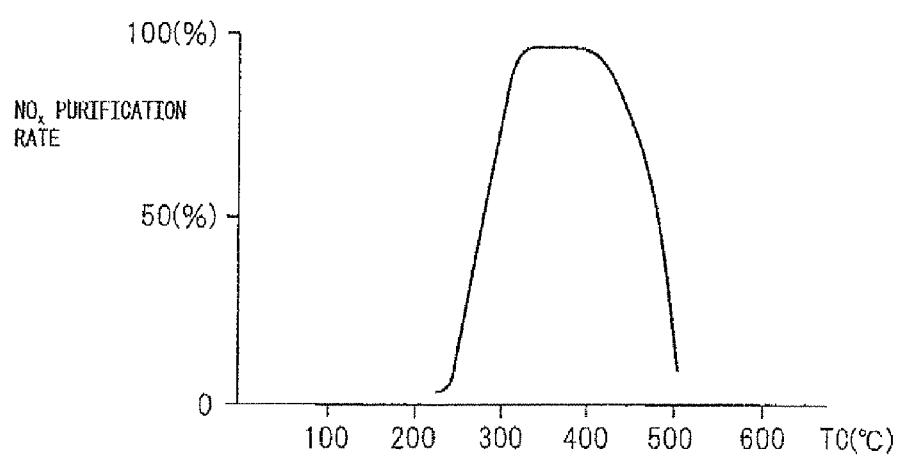
FIG. 9 is a view of an $NO_x$ purification rate.

FIG. 9 shows the $NO_x$ purification rate when making the $NO_x$ purification part 46 function as an $NO_x$ storage catalyst in this way. Note that, in FIG. 9; the abscissa indicates the catalyst temperature TC of the $NO_x$ purification part 46. When making the $NO_x$ purification part 46 function as a $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

The $NO_x$ purification rate falls in this way when the catalyst temperature TC becomes 400° C. or more because if the catalyst temperature TC becomes 400° C. or more, the nitrates break down under heat and are released in the form of $NO_2$ from the $NO_x$ purification part 46. That is, so long as storing $NO_x$ in the form of nitrates, when the catalyst temperature TC is high, it is difficult to obtain a high $NO_x$ purification rate. However, with the new $NO_x$ purification method shown from FIG. 4 to FIGS. 6A and 6B, as will be understood from FIGS. 6A and 6B, nitrates are not produced or even if produced, are very slight in amount, therefore, as shown in FIG. 5, even when the catalyst temperature TC is high, a high $NO_x$ purification rate is obtained.

That is, the $NO_x$ purification method shown from FIG. 4 to FIGS. 6A and 6B can be said to be a new $NO_x$ purification method which purifies $NO_x$ without formation of almost any nitrates when using an $NO_x$ purification part which carries a precious metal catalyst and forms a basic layer which can absorb $NO_x$. In actuality, when using this new $NO_x$ purification method, the nitrates which are detected from the basic layer 53 become much smaller in amount compared with the case of making the $NO_x$ purification part 46 function as an $NO_x$ storage catalyst.

Next, referring to FIG. 10 to FIG. 15, the new $NO_x$ purification method which is shown in FIG. 4 to FIGS. 6A and 6B will be explained in a bit more detail.

Figure 10:
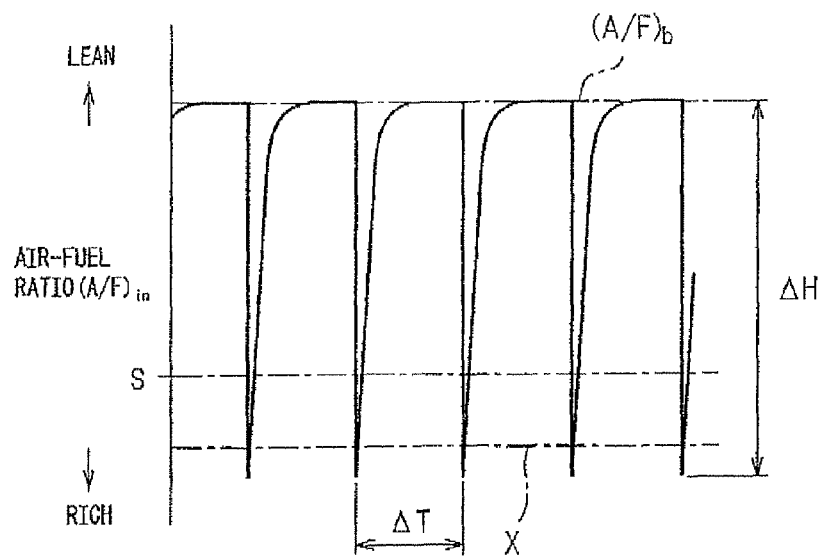
FIG. 10 is a time chart showing a change of the air-fuel ratio of the exhaust gas flowing to the catalyst device.

FIG. 10 shows enlarged the change in the air-fuel ratio (A/F) in shown in FIG. 4. Note that, as explained above, the change in the air-fuel ratio (A/F) in of the exhaust gas flowing into the catalyst device 13 simultaneously shows the change in concentration of the hydrocarbons which flow into the catalyst device 13. Note that, in FIG. 10, ΔH shows the amplitude of the change in concentration of hydrocarbons HC which flow into the catalyst device 13, while ΔT shows the vibration period of the concentration of the hydrocarbons which flow into the catalyst device 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the catalyst device 13 when stopping the feed of hydrocarbons. On the other hand, in FIG. 10, X shows the upper limit of the air-fuel ratio (A/F) in which is used for producing the reducing intermediate without the produced active $NO_2$* being stored in the form of nitrates inside the basic layer 53. To make the active $NO_2$* and the modified hydrocarbons react and produce the reducing intermediate, it is necessary to make the air-fuel ratio (A/F) in lower than the upper limit X of this air-fuel ratio.

In other words, in FIG. 10, X shows the lower limit of the concentration of hydrocarbons required for making the active $NO_2$* and modified hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_2$*, that is, the air-fuel ratio (A/F) in. The upper limit X of the air-fuel ratio required for producing the reducing intermediate will below be called the "demanded minimum air-fuel ratio".

In the example shown in FIG. 10, the demanded minimum air-fuel ratio X is rich, therefore, in this case, to form the reducing intermediate, the air-fuel ratio (A/F) in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F) in is maintained lean while periodically reducing the air-fuel ratio (A/F) in so as to form the reducing intermediate.

In this case, whether the demanded minimum air-fuel ratio X becomes rich or becomes lean depends on the oxidizing strength of the $NO_x$ purification part 46. In this case, the $NO_x$ purification part 46, for example, becomes stronger in oxidizing strength if increasing the carried amount of the precious metal 51 and becomes stronger in oxidizing strength if strengthening the acidity. Therefore, the oxidizing strength of the $NO_x$ purification part 46 changes due to the carried amount of the precious metal 51 or the strength of the acidity.

Figure 11:
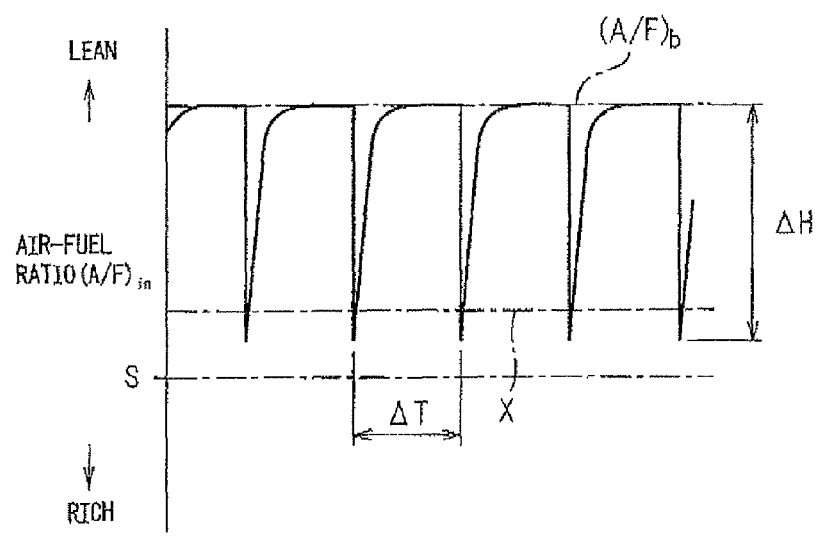
FIG. 11 is a time chart showing a change of the air-fuel ratio of the exhaust gas flowing to the catalyst device.

Now, if using an $NO_x$ purification part 46 with a strong oxidizing strength, as shown in FIG. 11, if maintaining the air-fuel ratio (A/F) in lean while periodically lowering the air-fuel ratio (A/F) in, the hydrocarbons end up becoming completely oxidized when the air-fuel ratio (A/F) in is reduced. As a result, the reducing intermediate can no longer be produced. As opposed to this, when using an $NO_x$ purification part 46 with a strong oxidizing strength, as shown in FIG. 10, if making the air-fuel ratio (A/F) in periodically rich, when the air-fuel ratio (A/F) in is made rich, the hydrocarbons will be partially oxidized, without being completely oxidized, that is, the hydrocarbons will be modified, consequently the reducing intermediate will be produced. Therefore, when using an $NO_x$ purification part 46 with a strong oxidizing strength, the demanded minimum air-fuel ratio X has to be made rich.

On the other hand, when using an $NO_x$ purification part 46 with a weak oxidizing strength, as shown in FIG. 11, if maintaining the air-fuel ratio (A/F) in lean while periodically lowering the air-fuel ratio (A/F) in, the hydrocarbons will be partially oxidized without being completely oxidized, that is, the hydrocarbons will be modified and consequently the reducing intermediate will be produced. As opposed to this, when using an $NO_x$ purification part 46 with a weak oxidizing strength, as shown in FIG. 10, if making the air-fuel ratio (A/F) in periodically rich, a large amount of hydrocarbons will be exhausted from the $NO_x$ purification part 46 without being oxidized and consequently the amount of hydrocarbons which is wastefully consumed will increase. Therefore, when using an $NO_x$ purification part 46 with a weak oxidizing strength, the demanded minimum air-fuel ratio X has to be made lean.

Figure 12:
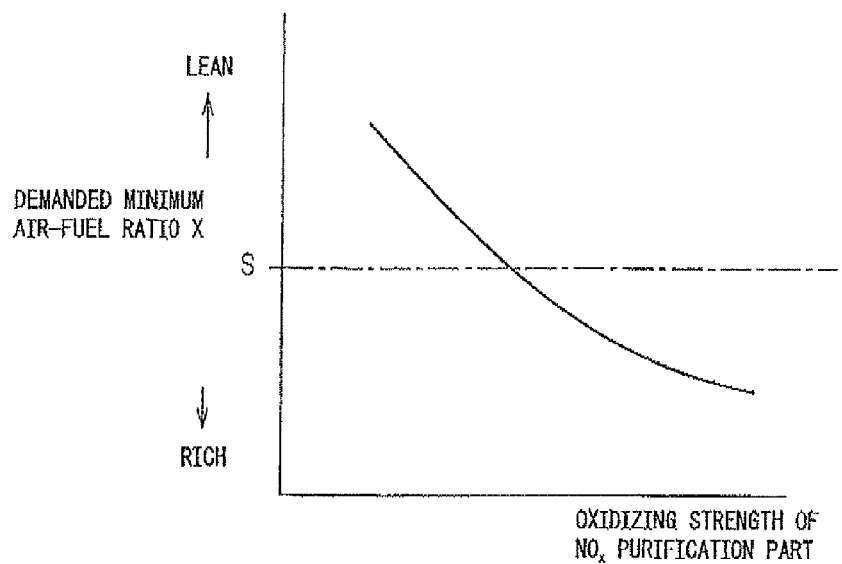
FIG. 12 is a view showing a relationship between an oxidizing strength of an $NO_x$ purification part and a demanded minimum air-fuel ratio X.

That is it is learned that the demanded minimum air-fuel ratio X, as shown in FIG. 12, has to be reduced the stronger the oxidizing strength of the $NO_x$ purification part 46. In this way the demanded minimum air-fuel ratio X becomes lean or rich due to the oxidizing strength of the $NO_x$ purification part 46. Below, taking as example the case where the demanded minimum air-fuel ratio X is rich, the amplitude of the change in concentration of hydrocarbons flowing into the catalyst device 13 and the vibration period of the concentration of hydrocarbons flowing into the catalyst device 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F) in the demanded minimum air-fuel ratio X or less increases and along with this the excess amount of hydrocarbons which did not contribute to the production of the reducing intermediate also increases. In this case, to purify the $NO_x$ well, as explained above, it is necessary to make the excess hydrocarbons oxidize. Therefore, to purify the $NO_x$ well, the larger the amount of excess hydrocarbons, the larger the amount of oxygen which is required.

In this case, if raising the oxygen concentration in the exhaust gas, the amount of oxygen can be increased. Therefore, to purify the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
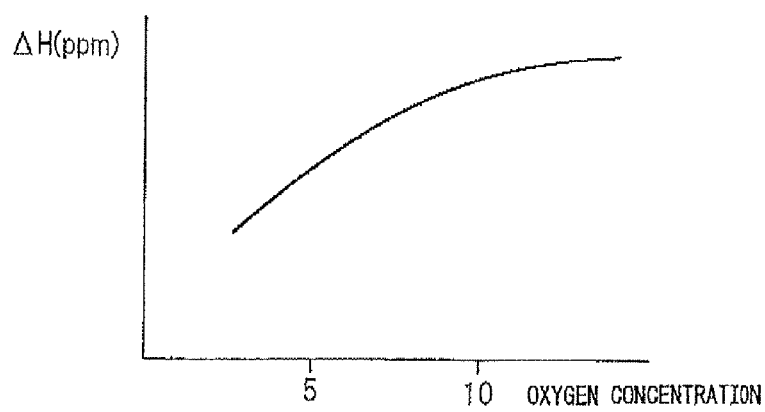
FIG. 13 is a view showing a relationship between an oxygen concentration in exhaust gas and an amplitude ΔH of a hydrocarbon concentration giving the same $NO_x$ purification rate.

FIG. 13 shows the relationship between the oxygen concentration in the exhaust gas before the hydrocarbons are fed and the amplitude $\Delta H$ of the hydrocarbon concentration when the same $NO_x$ purification rate is obtained. To obtain the same $NO_x$ purification rate from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_x$ purification rate, the higher the base air-fuel ratio (A/F)b becomes, the greater the amplitude $\Delta T$ of the hydrocarbon concentration has to be made. In other words, to purify the $NO_x$ well, the lower the base air-fuel ratio (A/F)b becomes, the more the amplitude $\Delta T$ of the hydrocarbon concentration can be reduced.

Figure 14:
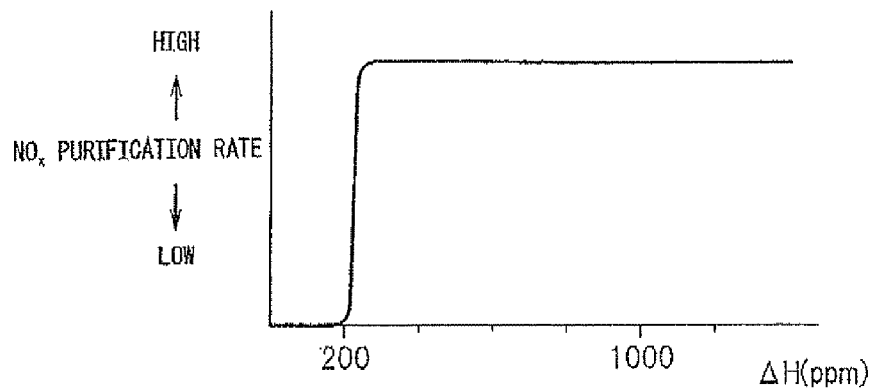
FIG. 14 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to purify the $NO_x$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_x$ purification rate can be obtained.

On the other hand, it is learned that when the base air-fuel ratio (A/F)b is the highest, if making the amplitude $\Delta H$ of the hydrocarbon concentration 10000 ppm or so, an excellent $NO_x$ purification rate is obtained. Further, if the amplitude $\Delta H$ of the hydrocarbon concentration is over 10000 ppm, there is the danger that the new $NO_x$ purification method which is shown from FIG. 4 to FIGS. 6A and 6B can no longer be performed. Therefore, in the present invention, the predetermined range of the amplitude of the hydrocarbon concentration is made 200 ppm to 10000 ppm.

Figure 15:
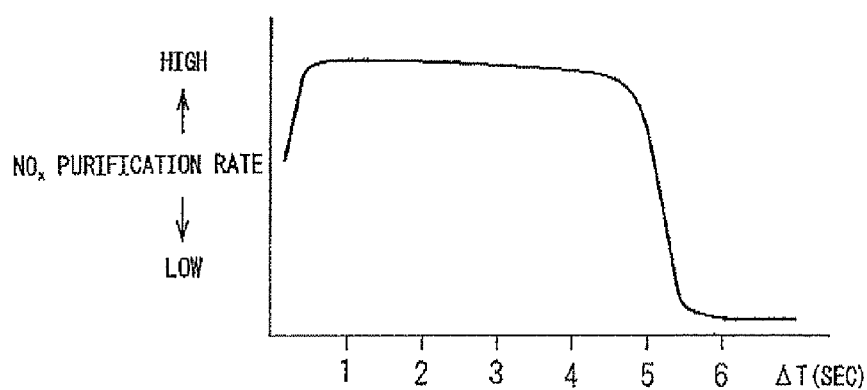
FIG. 15 is a view showing a relationship between a vibration period ΔT of a hydrocarbon concentration and an $NO_x$ purification rate.

Further, if the vibration period $\Delta T$ of the hydrocarbon concentration becomes longer, the oxygen concentration around the active $NO_2^*$ becomes higher in the time after the hydrocarbons are fed to when the hydrocarbons are next fed. In this case, if the vibration period $\Delta T$ of the hydrocarbon concentration becomes longer than about 5 seconds, the active $NO_2^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_x$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the $NO_x$ purification part 46, therefore, as shown in FIG. 15, if the vibration period $\Delta T$ of the hydrocarbon concentration becomes about 0.3 second or less, the $NO_x$ purification rate falls. Therefore, in the present invention, the vibration period of the hydrocarbon concentration is made from 0.3 second to 5 seconds.

Now in en embodiment of the present invention, by changing the injection amount and injection timing of hydrocarbons from the hydrocarbon feed valve 15, the amplitude $\Delta H$ and the vibration period $\Delta T$ of the hydrocarbon concentration are controlled to the optimum values in accordance with the operating state of the engine. In this case, the injection amount of hydrocarbons W enabling the optimal change of concentration of hydrocarbons in accordance with the engine operating state to be obtained changes in accordance with the operating state of the engine. In this embodiment according to the present invention, combinations of the amplitude $\Delta H$ and the vibration period $\Delta T$ are stored as a function of the demanded torque TQ of the engine and the engine speed N in the form of a map such as shown in FIG. 16 in advance in the ROM 32.

The optimum base air-fuel ratio (A/F)b is set for each engine operating state. In the map shown in FIG. 16, the amplitude $\Delta H$ is set for the base air-fuel ratio (A/F)b for each engine operating state so as to give the optimum air-fuel ratio for the oxidizing strength of the $NO_x$ purification part 46 (demanded minimum air-fuel ratio X shown in FIG. 12 or air-fuel ratio slightly smaller than the demanded minimum air-fuel ratio X). To raise the $NO_x$ purification rate, the larger the amount of $NO_x$ which is exhausted from a combustion chamber 2 is, the large the amount of reducing intermediate that must be produced at the $NO_x$ purification part 46 is. The amplitude $\Delta H$ is set based on the base air-fuel ratio (A/F)b and the oxidizing strength of the $NO_x$ purification part 46, so it is not preferable to make it change with respect to the amount of $NO_x$ in the exhaust gas which is exhausted from a combustion chamber 2. Due to this, in an engine operating state where the base air-fuel ratio (A/F)b is the same, the larger the amount of $NO_x$ which is contained in a unit exhaust gas amount exhausted from a combustion chamber 2 is, the shorter the vibration period $\Delta T$ is set in the predetermined range. If controlling the concentration of hydrocarbons which flow into the catalyst device 3 based on the map shown in FIG. 16 for the current engine operating state, it is possible to purify well the $NO_x$ which is exhausted from the combustion chamber 2 at the current time.

Now, the $NO_x$ purification part 46 does not perform the $NO_x$ purification action by the new $NO_x$ purification Method until the catalysts 51 and 52 are activated. Therefore, in this embodiment according to the present invention, before the $NO_x$ purification part 46 is activated, the feed of hydrocarbons from the hydrocarbon feed valve 15 is stopped. When the $NO_x$ purification part 46 is activated, the feed of hydrocarbons from the hydrocarbon feed valve 15 is started and the $NO_x$ purification action by the new $NO_x$ purification method is performed.

In this regard, as explained before, if making the feed period of the hydrocarbons longer, the $NO_x$ in the exhaust gas is stored in the form of nitrates in the basic layer 53. Therefore, even when the feed of hydrocarbons from the hydrocarbon feed valve 15 is stopped such as before activation of the $NO_x$ purification part 46, the $NO_x$ in the exhaust gas is stored in the form of nitrates in the basic layer 53. However, when the $NO_x$ purification part 46 is not activated, the $NO_x$ storage action is also not actively performed. Therefore, at this time, the majority of the $NO_x$ which is contained in the exhaust gas is exhausted into the atmosphere without being stored in the $NO_x$ purification part 46.

As the method of keeping $NO_x$ from being exhausted into the atmosphere in this way, it may be considered to arrange an $NO_x$ adsorption part able to adsorb the $NO_x$ which is contained in the exhaust gas inside the engine exhaust passage. For example, the $NO_x$ adsorption part may be made a silver-alumina type.

A silver-alumina type $NO_x$ adsorption part uses alumina as a carrier coat material and carries silver oxide. It can adsorb the $NO_x$ in the exhaust gas as silver nitrate and desorbs the adsorbed $NO_x$ when a first set temperature (about 300° C.) is reached.

A silver-alumina type $NO_x$ adsorption part, for example, is obtained by forming an alumina $Al_2O_3$ carrier coat layer on a substrate and making the alumina carrier coat layer carry silver oxide $Ag_2O$ in a ratio of 0.2 mol of silver to 200 g of alumina (to improve the heat resistance, lanthanum La may also be included).

As the method of preparation of this catalyst, for example, alumina. MI386 ($La/Al_2O_3$) powder: 1600 g, a binder A520: 710.4 g, and water: 3600 g are stirred by an attritor for 20 minutes, then the mixture is coated on the substrate at a rate of 200 g/liter per unit volume. Next, the result is fired in the atmosphere at 250° C. for 30 minutes, then fired at 500° C. for 1 hour to form an alumina carrier coat layer on the substrate.

On the other hand, silver nitrate 236.2 g is dissolved in ion exchange water to 1700 cc to prepare a silver nitrate aqueous solution with an Ag concentration of 0.82 mol/liter.

In such a silver nitrate aqueous solution, the above-mentioned alumina carrier coat layer is immersed for 30 minutes to make it carry 0.2 mol/liter of Ag per unit volume by adsorption. Next, a blower type dryer is operated to dry the specimen for 20 minutes, then this is fired in the atmosphere at 550° C. for 3 hours, then fired at 500° C. for 3 hours while running 7 liters of nitrogen containing 5% hydrogen per 1 minute over it.

In the thus prepared catalyst, silver oxide $Ag_2O$ is exposed from the alumina $Al_2O_3$ carrier coated layer. The NO in the exhaust gas can be oxidized to $NO_2$, then held well as silver nitrate $AgNO_3$.

FIG. 17 shows the relationship between the temperature TA and the $NO_x$ desorption amount at the silver-alumina type $NO_x$ adsorption part. The $NO_x$ adsorption part is believed to not only adsorb $NO_x$ as silver nitrate, but also to adsorb $NO_x$ as silver nitrite $AgNO_2$. The $NO_x$ which is adsorbed as silver nitrate is desorbed at the first set temperature TA1, but the $NO_x$ which is adsorbed as silver nitrite is believed to be desorbed at a second set temperature TA2 (about 150° C.) lower than the first set temperature TA1. Here, it is believed that when the $NO_x$ adsorption part is less than the second set temperature TA2, the $NO_x$ in the exhaust gas is mainly adsorbed as silver nitrite, while when the $NO_x$ adsorption part is higher than the second set temperature TA2 and less than the first set temperature TA1, the $NO_x$ in the exhaust gas is mainly adsorbed as silver nitrate.

In the present embodiment, such an $NO_x$ adsorption part, as shown in FIG. 2A, may be formed as a bottom coat layer 47 of the catalyst device 13. Due to this, before the $NO_x$ purification part 46 becomes activated, it is possible to make the $NO_x$ which is contained in the exhaust gas pass through the $NO_x$ purification part 46 and be adsorbed at the $NO_x$ adsorption part 47. However, the $NO_x$ adsorption part 47, as explained before, only causes the $NO_x$ which was adsorbed as silver nitrite at the time of less than the second set temperature TA2 to desorb when reaching the second set temperature TA2 and causes the $NO_x$ which was adsorbed as silver nitrate at the time higher than the second set temperature TA2 and less that the first set temperature TA1 to desorb when reaching the first set temperature TA1. If not purifying the $NO_x$ desorbed in this way at the $NO_x$ purification part 46, it is not possible to decrease the amount of $NO_x$ which is released into the atmosphere.

FIG. 18 is a first flow chart for estimating the $NO_x$ amount A which is desorbed from the $NO_x$ adsorption part 47. First, at step 101, it is judged if the temperature TA of the $NO_x$ adsorption part 47 estimated from the output signal of the temperature sensor 23 is less than the second set temperature TA2. If this judgment is "yes", the $NO_x$ in the exhaust gas exhaust gas is adsorbed as silver nitrite at the $NO_x$ adsorption part 47. Due to this, at step 102, the amount a2 of adsorption of $NO_x$ newly adsorbed at the $NO_x$ adsorption part 47 as silver nitrite per unit time, determined based on the amount of $NO_x$ exhausted from a cylinder per unit time in each operating state, is determined using a map etc. based on the current engine operating state (engine load and engine speed) and the current temperature TA of the $NO_x$ adsorption part 47 (the lower the temperature TA, the easier the adsorption). The unit time here becomes the repetition time of the present flow chart.

Next, at step 103, the low temperature side $NO_x$ adsorption amount A2 of $NO_x$ which is adsorbed at the $NO_x$ adsorption part 47 as silver nitrite is increased by the amount of adsorption a2 determined at step 102. In this way, when the temperature TA of the $NO_x$ adsorption part 47 is less than the second set temperature TA2, the $NO_x$ in the exhaust gas 47 to the $NO_x$ adsorption part 47 is adsorbed as silver nitrite, and the low temperature side $NO_x$ adsorption amount A2 gradually increases.

On the other hand, when the judgment at step 101 is "no", at step 104, it is judged if the temperature TA of the $NO_x$ adsorption part 47 is the second set temperature TA2. If this judgment is "yes", almost all of the $NO_x$ which was adsorbed as silver nitrite is desorbed from the $NO_x$ adsorption part 47. Due to this, at step 105, the $NO_x$ desorption amount A at this time is made the current low temperature side $NO_x$ adsorption amount A2, next, at step 106, the low temperature side $NO_x$ adsorption amount A2 of $NO_x$ which is adsorbed at the $NO_x$ adsorption part 47 as silver nitrite is made "0" and the routine is ended.

Further, when the judgment at step 104 is "no", at the step 107, it is judged if the temperature TA of the $NO_x$ adsorption part 47 is less than the first set temperature TA1. When this judgment is "yes", that is, at the time when the temperature TA of the $NO_x$ adsorption part 47 is higher than the second set temperature TA2 and less than the first set temperature TA1, the $NO_x$ in the exhaust gas is adsorbed as silver nitrate at the $NO_x$ adsorption part 47. Due to this, at step 109, the amount of adsorption a1 of $NO_x$ newly adsorbed at the $NO_x$ adsorption part 47 as silver nitrate per unit time, determined based on the amount of $NO_x$ which is exhausted from a cylinder per unit time for each engine operating state, is determined from a map etc. based on the current engine operating state (engine load and engine speed) and the current temperature TA of the $NO_x$ adsorption part 47 (the lower the temperature TA, the easier the adsorption). The unit time here is the interval of repetition of this flow chart.

Next, at step 110, the high temperature side $NO_x$ adsorption amount A1 of $NO_x$ which is adsorbed at the $NO_x$ adsorption part 47 as silver nitrate is increased by the amount of adsorption a1 determined at step 109. In this way, when the temperature TA of the $NO_x$ adsorption part 47 is higher than the second set temperature TA2 and less than the first set temperature TA1, the $NO_x$ in the exhaust gas to the $NO_x$ adsorption part 47 is adsorbed as silver nitrate and the high temperature side $NO_x$ adsorption amount A1 is gradually increased.

On the other hand, if the judgment at step 107 is "no", at step 108, it is judged if the temperature TA of the $NO_x$ adsorption part 47 has become a first set temperature TA1. If this judgment is "yes", almost all of the $NO_x$ adsorbed as silver nitrate is desorbed from the $NO_x$ adsorption part 47. Due to this, at step 111, the $NO_x$ desorption amount A at this time is made the current high temperature side $NO_x$ adsorption amount A1, next, at step 112, the high temperature side $NO_x$ adsorption amount A1 of $NO_x$ which is adsorbed at the $NO_x$ adsorption part 47 as silver nitrate is made "0", then the routine is ended.

Further, when the judgment at step 108 is "no", that is, when the temperature TA of the $NO_x$ adsorption part 47 is higher than the first set temperature TA1, the $NO_x$ in the exhaust gas is adsorbed at the $NO_x$ adsorption part 47 as silver nitrate, so in the same way as above, at step 109, the amount a1 of adsorption per unit time is determined, while at step 110, the high temperature side $NO_x$ adsorption amount A1 of $NO_x$ which is adsorbed at the $NO_x$ adsorption part 47 as silver nitrate is increased by the amount of adsorption a1 determined at step 109. However, when the temperature TA of the $NO_x$ adsorption part 47 is higher than the first set temperature TA1, the ratio of adsorption of $NO_x$ in the exhaust gas as silver nitrate falls, so when the judgment at step 108 is "no", it is also possible to stop the cumulative addition of the high temperature side $NO_x$ adsorption amount A1.

In the above-mentioned flow chart, to simplify the explanation, the temperature TA at which $NO_x$ is released from the $NO_x$ adsorption part 47 was made the first set temperature TA1 (for example, about 300° C.) and the second set temperature TA2 (for example, about 150° C.), but these temperatures are not limited to single point temperatures. They may also be made a first set temperature range (for example, 290° C. to 310° C.) and a second set temperature range (for example, 140° C. to 160° C.).

Figure 19:
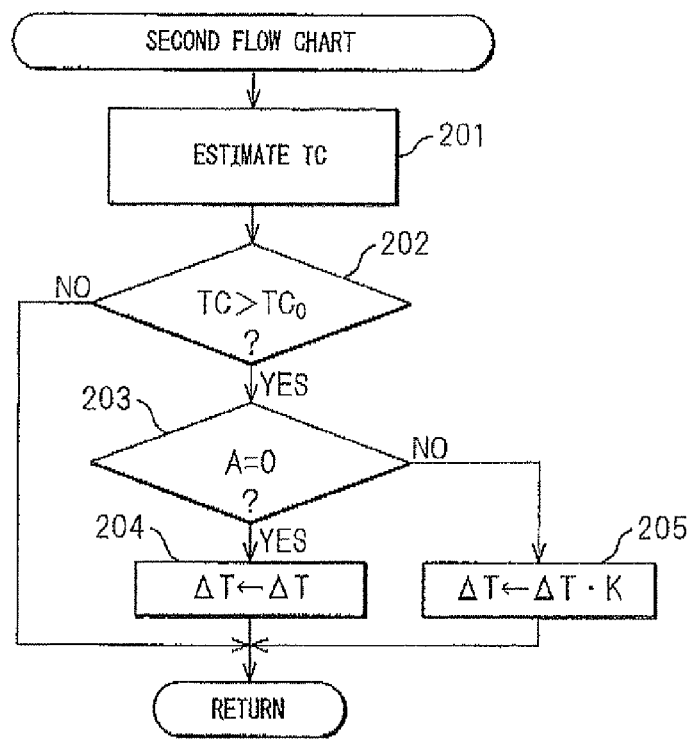
FIG. 19 is a second flow chart showing feed control of hydrocarbons.

FIG. 19 shows a second flow chart for control of the feed of hydrocarbons from the hydrocarbon feed valve 15. First, at step 201, the temperature TC of the $NO_x$ purification part 46 is estimated from the output signal of the temperature sensor 23. Next, at step 202, it is judged if the temperature TC of the $NO_x$ purification part 46 has exceeded the predetermined activation temperature $TC_0$ shown in FIG. 5. When $TC \leq C_0$, that is, when the $NO_x$ purification part 46 is not activated, the treatment cycle is ended. At this time, the feed of hydrocarbons from the hydrocarbon feed valve 15 is stopped.

In the present embodiment, the $NO_x$ purification part 46 and $NO_x$ adsorption part 47 are formed on the same carrier as a top coat layer and a bottom coat layer. They are in close contact, so the temperature of the $NO_x$ purification part 46 and the temperature of the $NO_x$ adsorption part 47 can be made equal.

The activation temperature $TC_0$ is higher than the second set temperature TA2, so the $NO_x$ which is desorbed when the $NO_x$ adsorption part 47 becomes the second set temperature TA2 cannot be purified and ends up being released into the atmosphere since the $NO_x$ purification part 46 is not the activation temperature $TC_0$. On the other hand, the activation temperature $TC_0$ is lower than the first set temperature TA1, so the $NO_x$ which is desorbed when the $NO_x$ adsorption part 47 becomes the first set temperature TA1 can be purified at the $NO_x$ purification part 46. In the present embodiment, the activation temperature $TC_0$ of the $NO_x$ purification part 46 is only slightly lower than the first set temperature TA1, so if starting the feed of hydrocarbons from the hydrocarbon feed valve 15 when the $NO_x$ purification part 46 exceeds the activation temperature $TC_0$ and becomes the first set temperature TA1, the $NO_x$ desorption amount A when the $NO_x$ adsorption part 47 becomes the first set temperature TA1 becomes the amount estimated at step 111 of the first flow chart of FIG. 18. However, if starting the feed of hydrocarbons from the hydrocarbon feed valve 15 immediately after the $NO_x$ purification part 46 reaches the activation temperature $TC_O$, after the temperature of the $NO_x$ adsorption part 47 becomes the activation temperature $TC_0$ of the $NO_x$ purification part 46, the $NO_x$ in the exhaust gas will be purified at the $NO_x$ purification part 46 and not be adsorbed at the $NO_x$ adsorption part 47 by the above-mentioned new $NO_x$ purification method, so it is necessary to stop the cumulative addition of the high temperature side $NO_x$ adsorption amount A1 at step 110 of the first flow chart.

In this regard, when the $NO_x$ adsorption part 47 becomes the first set temperature TA1, since the above-mentioned new $NO_x$ purification method is performed, even if controlling the feed of hydrocarbons from the hydrocarbon feed valve 15 by the map of FIG. 16 based on the current engine operating state, the $NO_x$ which is desorbed from the $NO_x$ adsorption part 47 at the first set temperature TA1 cannot be purified well at the $NO_x$ purification part 46.

In the second flow chart of FIG. 19, when the judgment at step 202 is "yes", it is judged at step 203 that the current $NO_x$ desorption amount A of $NO_x$ which is desorbed from the $NO_x$ adsorption part 47 is "0". When the temperature TA of the $NO_x$ adsorption part 47 is not the second set temperature TA2 and first set temperature TA1, $NO_x$ is not desorbed from the $NO_x$ adsorption part 47. Since the $NO_x$ desorption amount A is "0", the judgment at step 203 is "yes". At this time, at step 204, at the base air-fuel ratio (A/F)b of the current engine operating state, the amount of hydrocarbons which is fed from the hydrocarbon feed valve 15 is controlled so that the concentration of hydrocarbons flowing into the catalyst device 13 is made to vibrate by the amplitude ΔH and vibration period ΔT set for the current engine operating state based on the map shown in FIG. 16. Due to this, it is possible to purify well the $NO_x$ which is being exhausted from the combustion chamber 2 at the current time.

The temperature TA of the $NO_x$ adsorption part 47 is equal to the temperature TC of the $NO_x$ purification part 46, so when the temperature IC of the $NO_x$ purification part 46 becomes the first set temperature TA1, the temperature TA of the $NO_x$ adsorption part 47 also becomes the first set temperature TA1 and, as estimated in the first flow chart shown in FIG. 18, $NO_x$ is desorbed from the $NO_x$ adsorption part 47. Due to this, the $NO_x$ desorption amount A is not "0", so the judgment at step 203 is "no". At this time, at step 205, if at the base air-fuel ratio (A/F)b of the current engine operating state, the concentration of hydrogen flowing into the catalyst device 13 is made to vibrate by the amplitude ΔH and vibration period ΔT set for the current engine operating state based on the map shown in FIG. 16, the $NO_x$ which is currently exhausted from the combustion chamber 2 can be purified well, but the $NO_x$ which is desorbed from the $NO_x$ adsorption part 47 cannot be purified well. Due to this, at step 205, the vibration period ΔT which is set for the current engine operating state is corrected to become smaller by multiplication with a coefficient k etc. and the concentration of hydrocarbons flowing into the catalyst device 13 is made to vibrate by a period shorter than the period set for the current engine operating state so as to increase the feed amount of hydrocarbons. Due to this, a large amount of reducing intermediate is produced and held at the $NO_x$ purification part 46, so the $NO_x$ which is desorbed from the $NO_x$ adsorption part 47 also can also be sufficiently purified by reaction with the reducing intermediate.

In this way, to purify the $NO_x$ which is exhausted from a combustion chamber 2 and contained in exhaust gas and the $NO_x$ which is desorbed from the $NO_x$ adsorption part 47 together by the above-mentioned new $NO_x$ purification method, the vibration period ΔT which was set for the current engine operating state is corrected to become smaller so that the amount of hydrocarbons which pass over the exhaust gas flow surface of the $NO_x$ purification part becomes greater and to make the concentration of hydrocarbons which flow into the catalyst device 13 vibrate by the amplitude ΔH which was set for the current engine operating state and the new period corrected to become smaller. Here, it is also possible not to change the vibration period ΔT which was set for the current engine operating state, but to correct the amplitude ΔH which was set for the current engine operating state to become larger so that the amount of hydrocarbons which pass over the exhaust gas flow surface of the $NO_x$ purification part becomes greater, but the hydrocarbons which are exhausted from the $NO_x$ purification part 46 without being partially oxidized at the $NO_x$ purification part 46 may increase, so it is preferable to correct the vibration period ΔT.

Of course, to purify the $NO_x$ which is exhausted from a combustion chamber 2 and contained in exhaust gas and the $NO_x$ which is desorbed from the $NO_x$ adsorption part 47 together by the above-mentioned new $NO_x$ purification method, it is possible to correct the amplitude ΔR which was set for the current engine operating state to become larger, to correct the vibration period ΔT which was set for the current engine operating state to become smaller, and to use the corrected new amplitude and new vibration period to make the concentration of hydrogen flowing into the catalyst device 13 vibrate.

Here, the greater the $NO_x$ desorption amount A is, to produce and hold a large amount of reducing intermediate at the $NO_x$ purification part 46, the more the vibration period ΔT is corrected to become shorter within the predetermined range (within 0.3 second to 5 seconds), that is, the coefficient k, which is a positive number smaller than 1, is made smaller. Further, in the case of the amplitude ΔH, this is corrected so that the greater the $NO_x$ desorption amount A is, the more it is corrected to become larger within the predetermined range (200 ppm to 10000 ppm).

In the present embodiment, the case where the $NO_x$ adsorption part 47 was made a silver-alumina type and $NO_x$ was desorbed from the $NO_x$ adsorption part 47 at the first set temperature TA1 and the second set temperature TA2 was explained, but of course the $NO_x$ adsorption part 47 is not limited to this. If it desorbs the adsorbed $NO_x$ only at a set temperature higher than the activation temperature $TC_0$ of the $NO_x$ purification part 46, the $NO_x$ which is desorbed from the $NO_x$ adsorption part 47 can be substantially completely purified at the $NO_x$ purification part 46 by the new $NO_x$ purification method.

Figure 20:
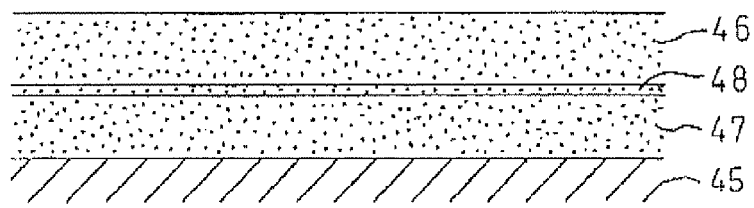
FIG. 20 is a view schematically showing a surface part of a substrate of a catalyst device showing another embodiment.

FIG. 20 shows another embodiment of the catalyst device 13. In this embodiment, when the precious metal catalyst of the $NO_x$ purification part 46 is not activated, the temperature of the $NO_x$ adsorption part 47 is kept from rising by the formation of a heat insulating layer between the top coat layer 46 and bottom coat layer 47. That is, if providing such a heat insulating layer 48, the temperature TA of the $NO_x$ adsorption part 47 can be made lower than the temperature of the $NO_x$ purification part 46. Due to this, if raising the performance of the heat insulating layer 48, when the temperature TA of the $NO_x$ adsorption part 47 becomes the second set temperature TA2 and $NO_x$ is desorbed, the temperature TC of the $NO_x$ purification part 46 rises to the activation temperature $TC_0$ of the precious metal catalyst and the new $NO_x$ purification method can be used to purify the $NO_x$ which is desorbed from the $NO_x$ adsorption part 47. In this case, in the second flow chart of FIG. 19, the judgment at step 203 is also "no" when the temperature TA of the $NO_x$ adsorption part 47 becomes the second set temperature TA2.

Further, if the heat insulating layer 48 is provided, before the temperature TA of the $NO_x$ adsorption part 47 becomes the second set temperature TA2, to make just the temperature TC of the $NO_x$ purification part 46 rise to the activation temperature $TC_0$ of the precious metal catalyst, it is possible to feed from the hydrocarbon feed valve 15 a slight amount of hydrocarbons to the precious metal catalyst of the $NO_x$ purification part 46 and burn it using the oxygen in the lean air-fuel ratio exhaust gas at the precious metal catalyst. Note that, the heat insulating layer 48 may be formed from silicon carbide SiC or alumina $Al_2O_3$.

In the present embodiment, the $NO_x$ purification part 46 and the $NO_x$ adsorption part 47 are, for example, formed as the top coat layer and bottom coat layer on the same honeycomb-shaped substrate 45. The $NO_x$ purification part 46 and $NO_x$ adsorption part 47 are housed integrally in the same housing. However, this does not limit the present invention. For example, it is also possible to house the $NO_x$ purification part 46 and $NO_x$ adsorption part 47 in separate housings and arrange the $NO_x$ adsorption part 47 at the upstream side of the $NO_x$ purification part 46. In such configuration, the $NO_x$ which is desorbed from the $NO_x$ adsorption part 47 can be purified at the $NO_x$ purification part 46.

In this case, the temperature TA of the $NO_x$ adsorption part 47 and the temperature TC of the $NO_x$ purification part 46 differ, so are separately estimated or measured. The hydrocarbon feed valve 15 is arranged between the $NO_x$ adsorption part 47 and the $NO_x$ purification part 46. Before the temperature TA of the $NO_x$ adsorption part 47 becomes the second set temperature TA2, to make just the temperature TC of the $NO_x$ purification part 46 rise to the activation temperature $TC_0$ of the precious metal catalyst, the hydrocarbon feed valve 15 can feed a slight amount of hydrocarbons to the precious metal catalyst of the $NO_x$ purification part 46 and burn it using the oxygen in the lean air-fuel ratio exhaust gas.

In this regard, in the new $NO_x$ purification method in the $NO_x$ purification part 46, in the slight time period during which the hydrocarbon concentration was made higher, the reducing intermediate (R—NCO and R—$NH_2$) is produced and is surrounded by modified hydrocarbons, whereby it is held at the exhaust gas flow surface part 54. In the slight time during which the hydrocarbon concentration is lowered, the modified hydrocarbons are oxidized and the newly produced $NO_2$* reacts with the reducing intermediate and is purified, but if it were possible to hold a large amount of reducing intermediate at the exhaust gas flow surface part 54 of the $NO_x$ purification part 46 for a long period of time even in a lean burning exhaust gas, by making the exhaust gas flow surface part 54 of the $NO_x$ purification part 46 hold a large amount of reducing intermediate right before engine stopping, it would be possible to purify the $NO_x$ which desorbed when the temperature TA of the $NO_x$ adsorption part 47 became the second set temperature TA2 by the large amount of reducing intermediate held at the exhaust gas flow surface part 54 of the $NO_x$ purification part 46.

In this case, if, before the temperature TA of the $NO_x$ adsorption part 47 becomes the second set temperature TA2, the low temperature side $NO_x$ adsorption amount A2 which was estimated at step 103 of the first flow chart shown in FIG. 18 does not exceed the amount reducible by the large amount of reducing intermediate held at the exhaust gas flow surface part 54 of the $NO_x$ purification part 46, it is not necessary to feed hydrocarbons to raise the temperature TC of the $NO_x$ purification part 46 to the activation temperature $TC_0$.

However, if, before the temperature TA of the $NO_x$ adsorption part 47 becomes the second set temperature TA2, the low temperature side $NO_x$ adsorption amount A2 which was estimated at step 103 of the first flow chart shown in FIG. 18 exceeds the amount reducible by the large amount of reducing intermediate held at the exhaust gas flow surface part 54 of the $NO_x$ purification part 46, it is preferable to feed hydrocarbons to raise the temperature TC of the $NO_x$ purification part 46 to the activation temperature $TC_0$ before the temperature TA of the $NO_x$ adsorption part 47 becomes the second set temperature TA2. At this time, in the second flow chart of FIG. 19, at step 202, the $NO_x$ amount A which is desorbed from the $NO_x$ adsorption part 47 is decreased by the amount which is reduced by the large amount of reducing intermediate held at the exhaust gas flow surface part 54 of the $NO_x$ purification part 46. At least one of the amplitude ΔH and vibration period ΔT set for the current engine operating state may be corrected for the thus lowered $NO_x$ desorption amount A, then the concentration of hydrocarbons flowing to the $NO_x$ purification part 46 may be made to vibrate so that the amount of hydrocarbons which pass over the exhaust gas flow surface of the $NO_x$ purification part becomes greater.

LIST OF REFERENCE NUMERALS

4: intake manifold
5: exhaust manifold
13; catalyst device
15: hydrocarbon feed valve
45: substrate
46: $NO_x$ purification part
47: $NO_x$ adsorption part
50: catalyst carrier
51, 52: precious metal catalyst
53: basic layer

The invention claimed is:

1. An exhaust purification system of an internal combustion engine, the exhaust purification system comprising:
    a $NO_x$ adsorption part and a $NO_x$ purification part arranged inside of an engine exhaust passage, wherein
        the $NO_x$ purification part causes $NO_x$ that is contained in exhaust gas and modified hydrocarbons to react,
        the $NO_x$ adsorption part has a property of adsorbing the $NO_x$ that is contained in the exhaust gas, and has a property of desorbing the adsorbed $NO_x$ when a temperature of the $NO_x$ adsorption part rises,
    precious metal catalysts that are carried on an exhaust gas flow surface of the $NO_x$ purification part,
    a basic exhaust gas flow surface part that is formed around the precious metal catalysts, and
    an electronic control unit, wherein the electronic control unit is configured to control a vibration of a concentration of hydrocarbons flowing into the $NO_x$ purification part within a predetermined range of amplitude and within a predetermined range of period, and is configured to control the vibration period of the hydrocarbon concentration longer than the predetermined range, wherein
        when the electronic control unit controls the vibration of the concentration of hydrocarbons flowing into the $NO_x$ purification part within the predetermined range of amplitude and within the predetermined range of period, the $NO_x$ purification part has the property of chemically reducing the $NO_x$ that is contained in the exhaust gas without storing, or storing a fine amount of nitrates in the $NO_x$ adsorption part,
        when the electronic control unit controls the vibration period of the hydrocarbon concentration longer than the predetermined range the $NO_x$ adsorption part has a property that a storage amount of $NO_x$ that is contained in the exhaust gas increases,
        the electronic control unit is further configured to set, in accordance with a current engine operating state, the range of amplitude and the range of period of the vibration of the concentration of hydrocarbons that pass over the exhaust gas flow surface of the $NO_x$ purification part to reduce the current $NO_x$ that is contained in the exhaust gas, and is configured, when $NO_x$ is desorbed from the $NO_x$ adsorption part, to correct, within the range of amplitude and the range of period that have been set in accordance with the current engine operating state, the range of amplitude and the range of period of the vibration of the concentration of hydrocarbons that pass over the exhaust gas flow surface of the $NO_x$ purification part so that the amount of hydrocarbons that pass over the exhaust gas flow surface of the $NO_x$ purification part increases in order to reduce the $NO_x$ that is contained in the current exhaust gas and the $NO_x$ that is desorbed from said $NO_x$ adsorption part.

2. The exhaust purification system of an internal combustion engine as set forth in claim 1, wherein $NO_x$ is desorbed from the $NO_x$ adsorption part at a low temperature side desorption temperature that is lower than an activation temperature of the precious metal catalysts of the $NO_x$ purification part, and the electronic control unit is further configured to, before the $NO_x$ adsorption part becomes the low temperature side desorption temperature, feed the $NO_x$ purification part with hydrocarbons to cause a temperature of the precious metal catalysts to rise to the activation temperature.

3. The exhaust purification system of an internal combustion engine as set forth in claim 1, wherein the $NO_x$ purification part is formed as a top coat layer on a substrate and the $NO_x$ adsorption part is formed as a bottom coat layer between the $NO_x$ purification part and the substrate.

4. The exhaust purification system of an internal combustion engine as set forth in claim 2, wherein said $NO_x$ purification part is formed as a top coat layer on a substrate and the $NO_x$ adsorption part is formed as a bottom coat layer between the $NO_x$ purification part and the substrate.

5. The exhaust purification system of an internal combustion engine as set forth in claim 1, wherein when the electronic control unit controls the vibration of the concentration of hydrocarbons flowing into the $NO_x$ purification part within the predetermined range of amplitude and within the predetermined range of period, a reducing intermediate containing nitrogen and hydrocarbons is produced on the precious metal catalysts and held on the basic exhaust gas flow surface part, and the $NO_x$ contained in the $NO_x$ purification part is chemically reduced by the reducing intermediate held on the basic exhaust gas flow surface part.

6. The exhaust purification system of an internal combustion engine as set forth in claim 2, wherein when the electronic control unit controls the vibration of the concentration of hydrocarbons flowing into the $NO_x$ purification part within the predetermined range of amplitude and within the predetermined range of period, a reducing intermediate containing nitrogen and hydrocarbons is produced on the precious metal catalysts and held on the basic exhaust gas flow surface part, and the $NO_x$ contained in the $NO_x$ purification part is chemically reduced by the reducing intermediate held on the basic exhaust gas flow surface part.

7. The exhaust purification system of an internal combustion engine as set forth in claim 3, wherein when the electronic control unit controls the vibration of the concentration of hydrocarbons flowing into the $NO_x$ purification part within the predetermined range of amplitude and within the predetermined range of period, a reducing intermediate containing nitrogen and hydrocarbons is produced on the precious metal catalysts and held on the basic exhaust gas flow surface part, and the $NO_x$ contained in the $NO_x$ purification part is chemically reduced by the reducing intermediate held on the basic exhaust gas flow surface part.

8. The exhaust purification system of an internal combustion engine as set forth in claim 4, wherein when the electronic control unit controls the vibration of the concentration of hydrocarbons flowing into the $NO_x$ purification part within the predetermined range of amplitude and within the predetermined range of period, a reducing intermediate containing nitrogen and hydrocarbons is produced on the precious metal catalysts and held on the basic exhaust gas flow surface part, and the $NO_x$ contained in the $NO_x$ purification part is chemically reduced by the reducing intermediate held on the basic exhaust gas flow surface part.

* * * * *